(12) United States Patent
Yamamoto

(10) Patent No.: US 8,564,681 B2
(45) Date of Patent: Oct. 22, 2013

(54) METHOD, APPARATUS, AND COMPUTER-READABLE STORAGE MEDIUM FOR CAPTURING AN IMAGE IN RESPONSE TO A SOUND

(75) Inventor: Hiroki Yamamoto, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 674 days.

(21) Appl. No.: 12/509,067

(22) Filed: Jul. 24, 2009

(65) Prior Publication Data

US 2010/0026815 A1 Feb. 4, 2010

(30) Foreign Application Priority Data

Jul. 29, 2008 (JP) ................................ 2008-194800

(51) Int. Cl.
*H04N 5/235* (2006.01)
*H04N 5/228* (2006.01)

(52) U.S. Cl.
USPC ........................................................ 348/222.1

(58) Field of Classification Search
USPC .............. 348/231.2, 231.3, 231.4, 222.1
See application file for complete search history.

(56) References Cited

U.S. PATENT DOCUMENTS

| | | | | |
|---|---|---|---|---|
| 5,027,149 A * | 6/1991 | Hoshino et al. | ................. | 396/56 |
| 5,737,491 A * | 4/1998 | Allen et al. | ................... | 704/270 |
| 5,749,000 A * | 5/1998 | Narisawa | ...................... | 396/121 |
| 6,289,140 B1 * | 9/2001 | Oliver | .......................... | 382/313 |
| 6,762,692 B1 * | 7/2004 | Mingot et al. | ............. | 340/12.54 |
| 7,038,715 B1 * | 5/2006 | Flinchbaugh | ............ | 348/207.99 |
| 7,525,575 B2 * | 4/2009 | Rees et al. | ................ | 348/211.99 |
| 7,792,678 B2 * | 9/2010 | Hung | ............................. | 704/275 |
| 7,995,106 B2 * | 8/2011 | Oishi | ........................ | 348/222.1 |
| 2005/0018057 A1 * | 1/2005 | Bronstein et al. | ............. | 348/239 |
| 2005/0071169 A1 * | 3/2005 | Steinbiss | ....................... | 704/275 |
| 2005/0128311 A1 * | 6/2005 | Rees et al. | ................ | 348/211.99 |
| 2005/0267749 A1 * | 12/2005 | Yamada et al. | ............... | 704/231 |
| 2007/0200912 A1 * | 8/2007 | Hung | ........................ | 348/14.01 |
| 2008/0036869 A1 * | 2/2008 | Gustafsson et al. | ........ | 348/222.1 |
| 2008/0062280 A1 * | 3/2008 | Wang et al. | .............. | 348/231.99 |
| 2008/0218603 A1 * | 9/2008 | Oishi | ........................ | 348/231.99 |
| 2009/0262205 A1 * | 10/2009 | Smith | ........................ | 348/211.4 |
| 2009/0295948 A1 * | 12/2009 | Oishi | ........................... | 348/239 |

FOREIGN PATENT DOCUMENTS

| | | |
|---|---|---|
| CN | 1506741 A | 6/2004 |
| JP | 11-194392 A | 7/1999 |
| JP | 11-194392 A | 7/1999 |
| JP | 2006-184589 A | 7/2006 |

\* cited by examiner

*Primary Examiner* — Nicholas Giles

(74) *Attorney, Agent, or Firm* — Canon U.S.A., Inc. IP Division

(57) ABSTRACT

A method includes detecting a start and an end of a first sound that satisfies a present standard, obtaining image data in response to detection of the start and end of the first sound, storing the obtained image data, and determining the image data to be data that is to be stored, in accordance with a content of the first sound.

12 Claims, 17 Drawing Sheets

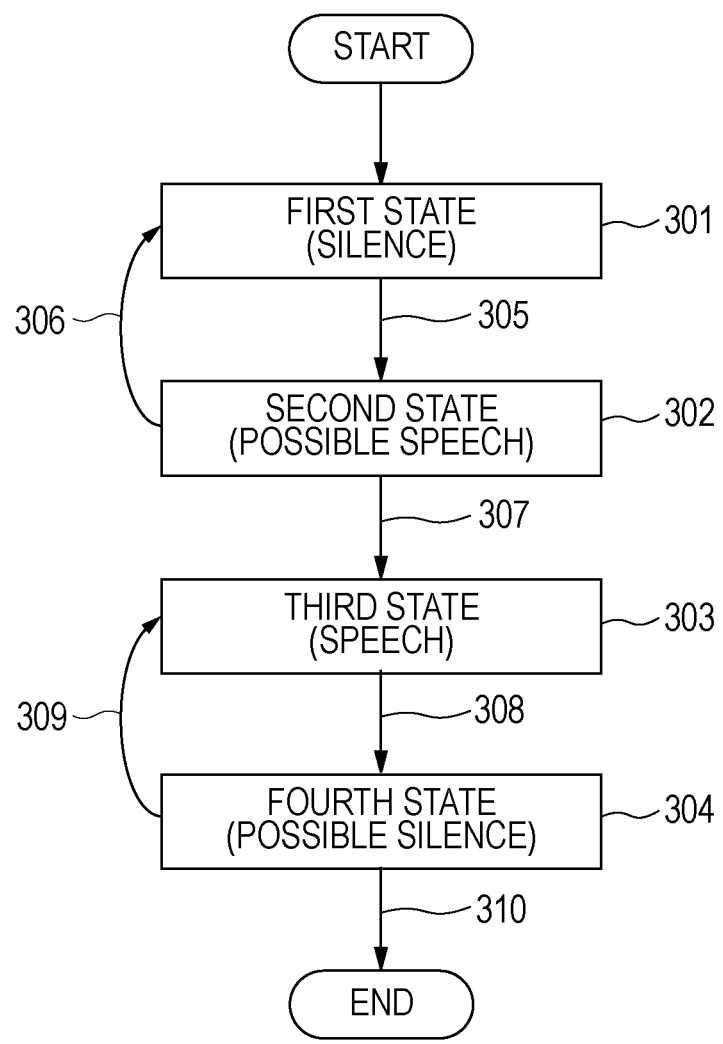

FIG. 10

| COMMAND | PROCESSING |
|---|---|
| Shoot | HOLD IMAGE CAPTURED AT TIME OF START OF UTTERANCE |
| Go | HOLD IMAGE CAPTURED AT TIME OF START OF UTTERANCE |
| Cheese | HOLD IMAGE CAPTURED AT TIME OF END OF UTTERANCE |
| Say Cheese | HOLD IMAGE CAPTURED AT TIME AT WHICH CERTAIN PERIOD OF TIME HAS PASSED FROM TIME OF END OF UTTERANCE |
| Five Four Three | HOLD IMAGE CAPTURED AT TIME AT WHICH CERTAIN PERIOD OF TIME HAS PASSED FROM TIME OF START OF UTTERANCE |
| Spot Metering | ACTIVATE SPOT METERING |
| Center Metering | ACTIVATE CENTER-WEIGHTED METERING |
| Use a Flash | ACTIVATE STROBE LIGHT |
| No Fash | DEACTIVATE STROBE LIGHT |

904    1002

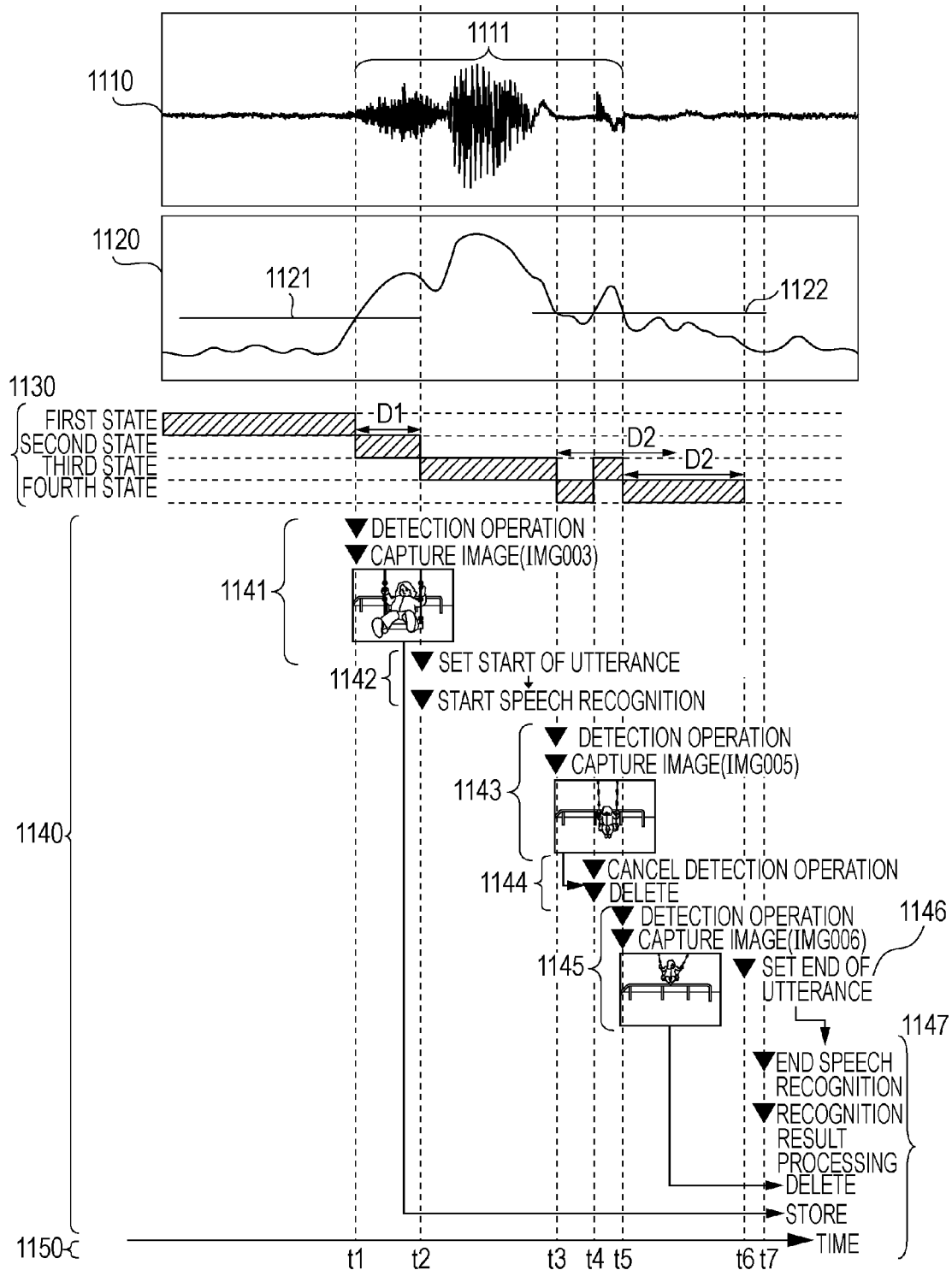

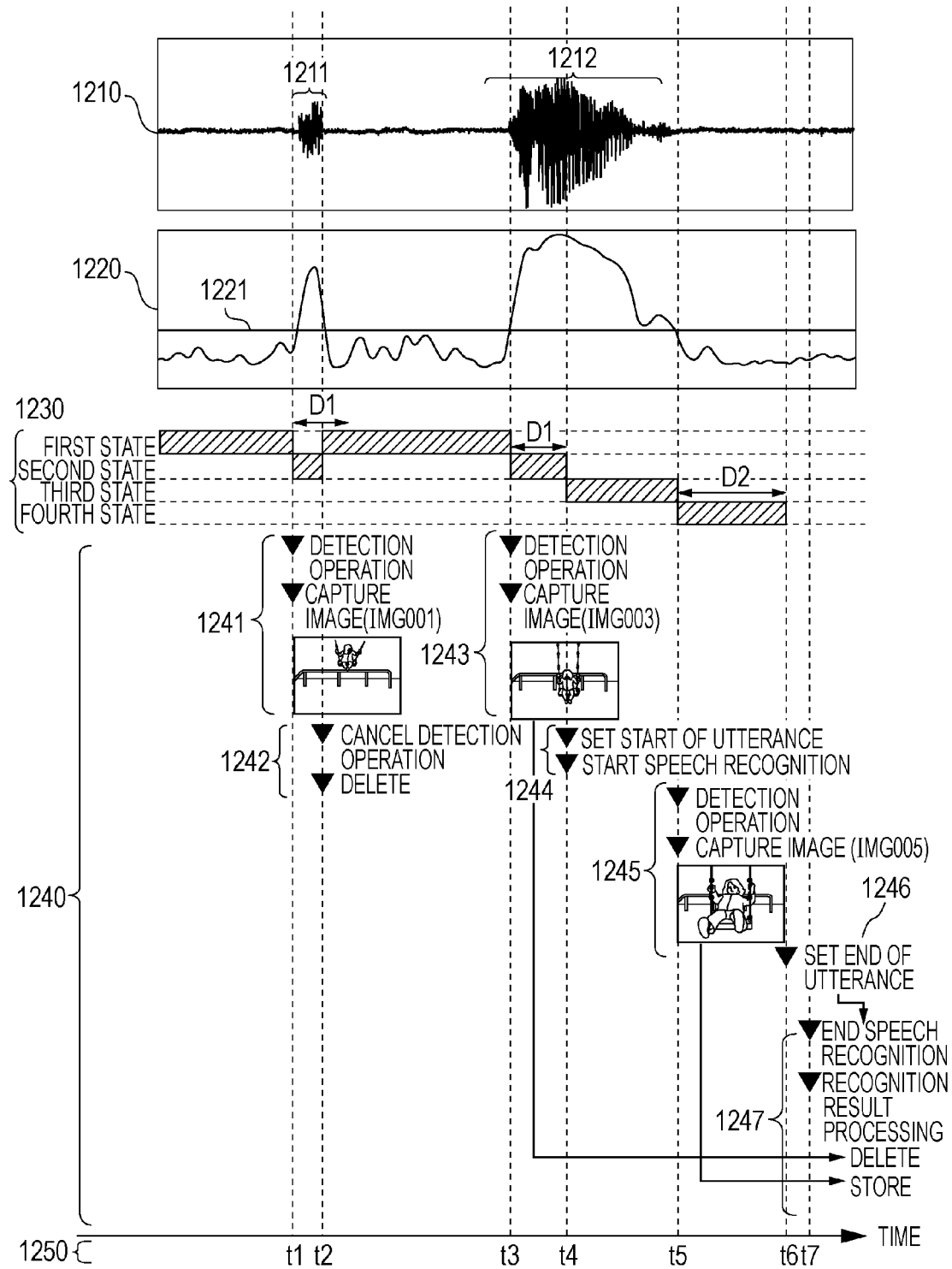

METHOD, APPARATUS, AND COMPUTER-READABLE STORAGE MEDIUM FOR CAPTURING AN IMAGE IN RESPONSE TO A SOUND

BACKGROUND OF THE INVENTION

1. Field of the Invention

The present invention relates to a technology for starting capturing of an image in response to a sound.

2. Description of the Related Art

Cameras having a function of executing capturing of an image upon detection of a volume of sound greater than a certain level (hereinafter referred to as a sound volume detecting shutter function) are known (Japanese Patent Laid-Open No. 11-194392). Utilization of this function enables capturing of an image at the time of utterance.

Moreover, cameras having a function of executing capturing of an image upon recognition of a voice command for capturing an image (hereinafter referred to as a speech recognition shutter function) are known (Japanese Patent Laid-Open No. 2006-184589). Utilization of this function enables capturing of an image when a user desires capturing of an image and utters. Here, when an image is captured utilizing a camera having the speech recognition shutter function, even though a user utters a speech command for capturing an image, an image capturing operation of the camera is not executed until the user has completely uttered the speech command for capturing an image. Thus, a time at which capturing of an image is desired may be missed.

In contrast, when an image is captured utilizing a camera having an existing sound volume detecting shutter function, an image capturing operation can be executed in response to a time at which speech is uttered. However, in this case, even when a sound, for example, a large noise or the like, other than desired speech is detected, an image capturing operation is executed. Thus, there is a situation in that undesired images may be stored.

For example, the above-described matter may be solved by causing cameras to perform a process of capturing an image in accordance with the word "shoot" uttered by a user at a user's desired time and a process of deleting a captured image in accordance with the speech command "delete". However, inputting of two different speech commands is not efficient.

The present invention has been made in light of the existing examples. According to the present invention, in accordance with a single speech command, an image is efficiently stored that is captured at a time reflecting a time at which a certain sound is input and that is an image desired by a user.

SUMMARY OF THE INVENTION

In order to efficiently store such an image, for example, a data conversion apparatus according to the present invention has the following structure.

According to an embodiment of the present invention, a method includes detecting a start of a first sound that satisfies a preset standard; detecting an end of the first sound; obtaining image data in response to detection of the start or end of the first sound; storing the obtained image data; and determining the image data to be data that is to be stored, in accordance with a content of the first sound.

According to another embodiment of the present invention, an apparatus includes a first detection unit configured to detect a start of a sound that satisfies a preset standard, a first obtaining unit configured to obtain first image data in response to detection of the start of the sound, a first storage control unit configured to store the first image data in a memory, a second detection unit configured to detect an end of the sound, a second obtaining unit configured to obtain second image data in response to detection of the end of the sound, a second storage control unit configured to store the second image data in the memory, and a determination unit configured to determine, in accordance with a content of the sound, one of the first image data and the second image data to be data that is to be stored and determine the other one to be data that is to be deleted.

According to yet another embodiment of the present invention, a method includes detecting a start of a sound that satisfies a preset standard, obtaining first image data in response to detection of the start of the sound, storing the first image data, detecting an end of the sound, obtaining second image data in response to detection of the end of the sound, storing the second image data, and determining one of the first image data and the second image data to be data that is to be stored and determining the other one to be data that is to be deleted, in accordance with a content of the sound.

Further features of the present invention will become apparent from the following description of exemplary embodiments with reference to the attached drawings.

BRIEF DESCRIPTION OF THE DRAWINGS

FIG. 3 is a diagram showing an example of states determined by a speech detection unit.

FIG. 10 is a diagram showing an example of a recognition result control table.

FIG. 11 is a diagram showing an operation in a case where an image is captured by means of the speech command "Shoot" utilizing the digital camera according to the first embodiment of the present invention.

FIG. 12 is a diagram showing an operation in a case where an image is captured by means of the speech command "Cheese" utilizing the digital camera according to the first embodiment of the present invention.

DESCRIPTION OF THE EMBODIMENTS

In the following, embodiments according to the present invention will be described with reference to the drawings.

Figure 1:
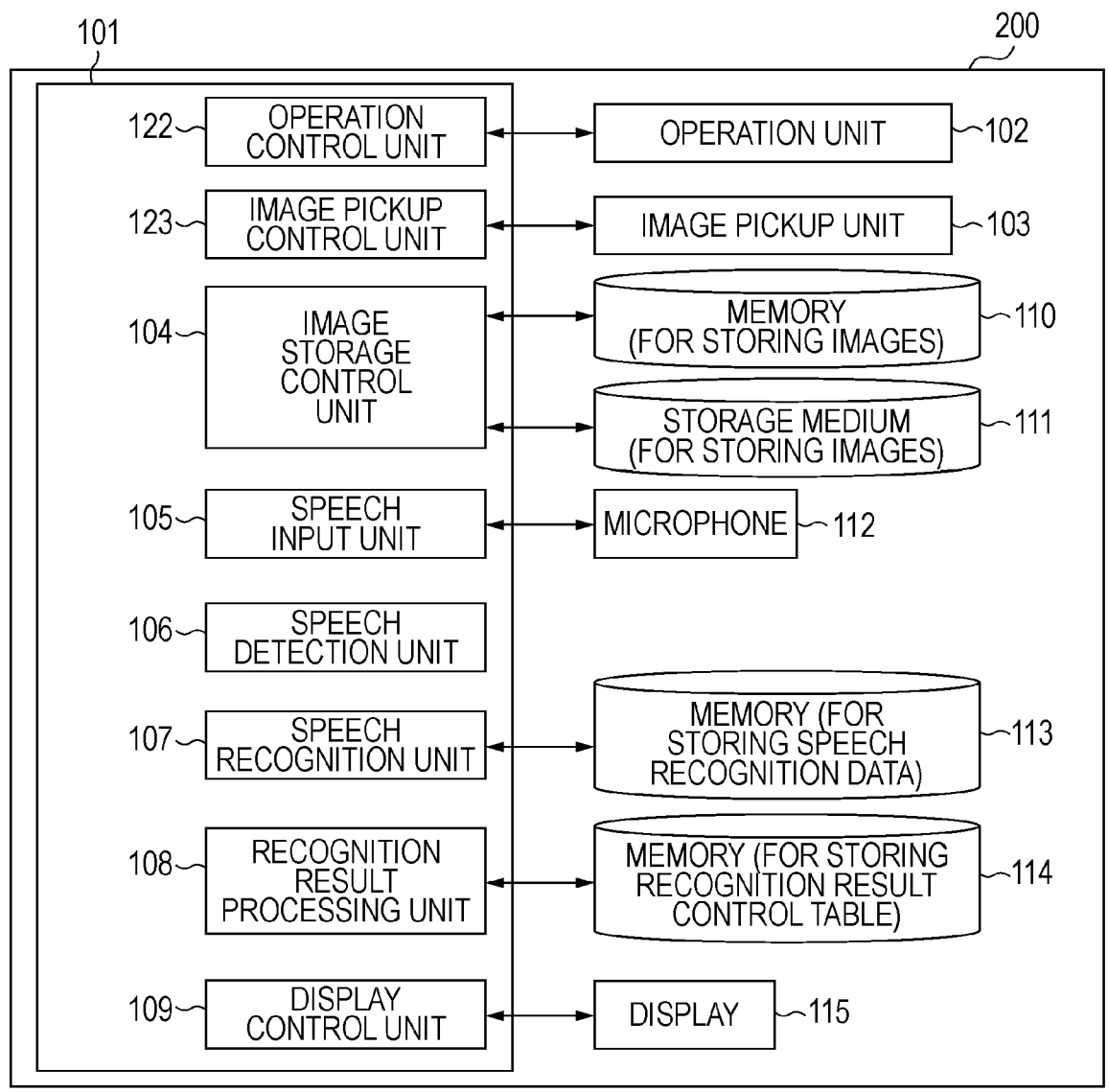
FIG. 1 is a functional block diagram showing an example of the structure of an information processing apparatus according to a first embodiment of the present invention.

FIG. 1 is a functional block diagram showing a digital camera, which is an example of the structure of an information processing apparatus according to a first embodiment.

In FIG. 1, a digital camera 200 includes a control unit 101, an operation unit 102, an image pickup unit 103, a memory (for storing images) 110, and a storage medium (for storing images) 111.

Moreover, the digital camera 200 includes a microphone 112, a memory (for storing speech recognition data) 113, a memory (for storing a recognition result control table) 114, and a display 115. In the following, the above-described units will be specifically described.

The control unit 101 controls operations of the operation unit 102, image pickup unit 103, memory (for storing images) 110, storage medium (for storing images) 111, microphone 112, memory (for storing speech recognition data) 113, memory (for storing a recognition result control table) 114, and display 115.

Here, processing performed by the control unit 101 will be described later.

Moreover, the control unit 101 is constituted by a central processing unit (CPU), a read-only memory (ROM), a random access memory (RAM), and the like.

Moreover, the control unit 101 includes, as software modules, an operation control unit 122, an image pickup control unit 123, an image storage control unit 104, a speech input unit 105, a speech detection unit 106, a speech recognition unit 107, a recognition result processing unit 108, and a display control unit 109.

The operation control unit 122 is a unit for detecting an operation performed to the operation unit 102 by a user.

The image pickup control unit 123 is a unit for causing the image pickup unit 103 to execute an image capturing operation.

The image storage control unit 104 controls writing of data into the memory (for storing images) 110 and storage medium (for storing images) 111, and reading of data, deleting of data, and the like from the memory (for storing images) 110 and storage medium (for storing images) 111.

The speech input unit 105 is a unit for converting a sound input via the microphone 112 into a digital audio signal and outputting the digital audio signal.

The speech detection unit 106 continuously processes, in units of one frame, the digital audio signal supplied from the speech input unit 105, and detects the target sound that satisfies a standard.

That is, the speech detection unit 106 identifies a period corresponding to the target sound from the received audio signal. Specifically, the speech detection unit 106 continuously processes, in units of one frame, the audio signal, and identifies, as the target sound, a section of the audio signal from detection of the audio signal that satisfies the start condition to detection of the audio signal that satisfies the end condition. Here, the target sound is, for example, utterance, applauding sound, or a whistle.

Hereinafter, a case where the target sound is utterance will be explained. In addition, "detecting the start of utterance" means detecting the audio signal that satisfies the start condition, and "detecting the end of utterance" means detecting the audio signal that satisfies the end condition.

Here, an utterance period is included in a period (time period) for which a user utters and is a time period from when the start of utterance is detected to when the end of utterance is detected.

Here, frames are processing units for dividing an audio signal that changes over time into sections each having a fixed time length (for example, 25.6 milliseconds). Here, a time can be expressed using the corresponding number of frames.

The speech recognition unit 107 includes, as software modules, an acoustic analysis unit and a search unit, and recognizes a command (what is called a speech command) included in a period for which a user utters.

Here, a command is a combination of sounds that can be recognized by the speech recognition unit 107. An example of the command is "Shoot".

The acoustic analysis unit analyzes an audio signal in units of one frame, and outputs, for example, feature data such as a Mel frequency cepstrum coefficient (MFCC).

The search unit performs search processing using an existing algorithm such as the Viterbi algorithm, and outputs a predetermined number of command and corresponding recognition scores as recognition results.

Moreover, when executing search processing, the search unit uses an acoustic model and a language model included in the memory (for storing speech recognition data) 113.

Here, the acoustic model and language model will be specifically described later.

Here, a recognition score may be an existing acoustic score indicating an acoustic similarity, an existing language score obtained from a language model, or a sum of a weighted recognition score and a weighted language score. Moreover, a recognition score may be an existing confidence score indicating the confidence of a recognition result.

Here, appropriate search processing can be executed for various sounds by using different scores or a plurality of scores.

The recognition result processing unit 108 obtains a recognition result output by the speech recognition unit 107 and determines control corresponding to the command included in the recognition result by referring to a recognition result control table stored in the memory (for storing a recognition result control table) 114.

Here, an example of the recognition result control table utilized in the first embodiment will be described later.

The display control unit 109 controls display content displayed on the display 115.

The operation unit 102 is a unit for a user to manually operate the digital camera 200.

Here, the operation unit 102 is constituted by a button, a switch, or the like.

The image pickup unit 103 generates an imaging signal of an image formed by a lens and performs image processing such as analog-to-digital (A/D) conversion on the generated imaging signal.

Here, the image pickup unit 103 is constituted by a lens, an imaging sensor, and the like.

The memory (for storing images) 110 temporarily stores image data of an image captured by the image pickup unit 103. Here, the memory (for storing images) 110 is a RAM or the like.

The storage medium (for storing images) 111 stores image data of an image captured by the image pickup unit 103, in the end of processing performed by the digital camera 200. Here, the storage medium (for storing images) 111 is a nonvolatile memory.

The memory (for storing images) 110 functions as a first memory, and the storage medium (for storing images) 111 functions as a second memory.

The microphone 112 receives an input user's speech and outputs the input speech data to the speech input unit 105.

Here, the microphone 112 is an existing monophonic microphone, an existing stereo microphone, or the like.

The memory (for storing speech recognition data) 113 stores data to execute speech recognition, an existing acoustic model such as, for example, a hidden Markov model (HMM), and an existing language mode such as N-gram or stochastic grammar.

Here, N-gram is a language model that calculates language probability by using N-word chain probability.

Moreover, a speech recognition grammar in which specific words and connection rules between words that can be recognized in speech recognition are written may be utilized as a language model. Here, an example of the speech recognition grammar utilized in the first embodiment will be described later.

Moreover, the memory (for storing speech recognition data) 113 is a nonvolatile memory or the like.

The memory (for storing a recognition result control table) 114 stores a recognition result control table. Moreover, the memory (for storing a recognition result control table) 114 is a nonvolatile memory.

Here, an example of the recognition result control table utilized in the first embodiment will be described later.

Here, such a nonvolatile memory may be an existing hard disk, an existing compact flash memory card, a Secure Digital (SD) card, or the like.

Moreover, such a nonvolatile memory may also be a compact disc (CD) or a digital versatile disc (DVD).

Moreover, such a nonvolatile memory may also be an external storage medium that can be connected to an information processing apparatus via an interface such as a local area network (LAN) adapter, or a universal serial bus (USB) adapter.

The display 115 displays an image captured by the image pickup unit 103, images stored in the information processing apparatus, the storage medium (for storing images) 111, and the like.

Moreover, the display 115 is, for example, a liquid crystal display (LCD), an organic electroluminescence (EL) display, or the like.

Figure 2A:
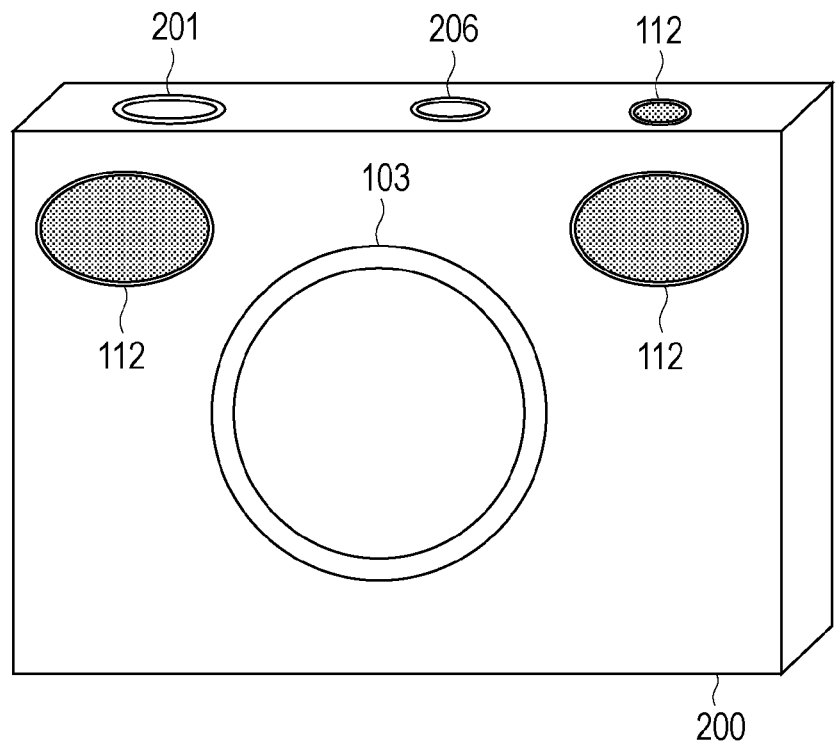
FIGS. 2A and 2B are external views of a digital camera used in the first embodiment of the present invention.
Figure 2B:
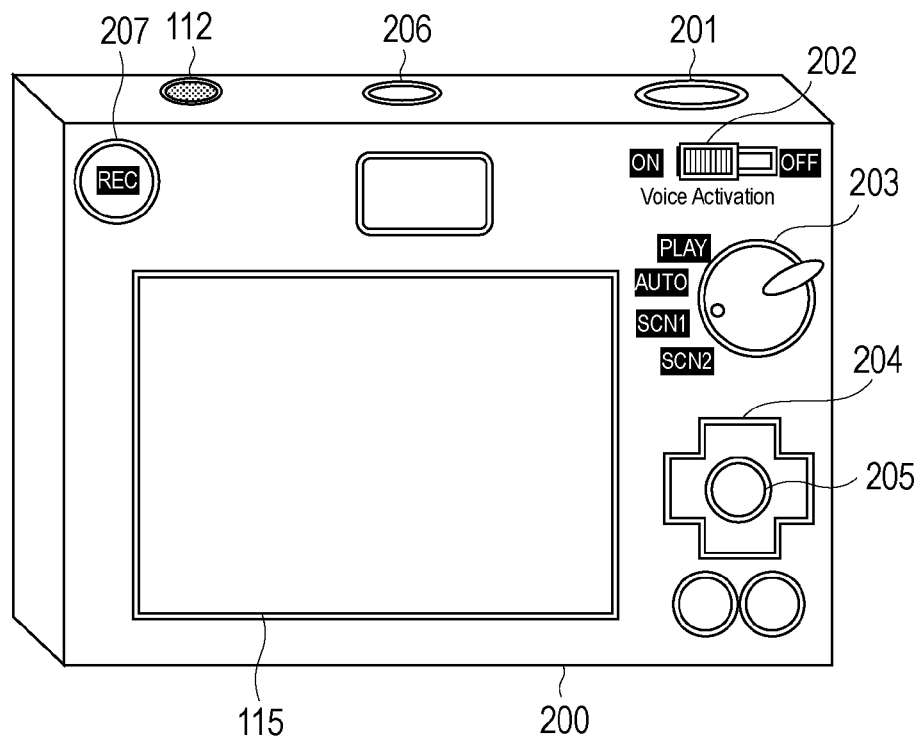

FIGS. 2A and 2B are external views of a digital camera according to the first embodiment of the present invention. Here, FIG. 2A is an external view of the front side of the digital camera 200. FIG. 2B is an external view of the back side of the digital camera 200.

Here, components the same as those indicated in FIG. 1 will be denoted by the same reference numerals and description thereof will be omitted.

In FIGS. 2A and 2B, the digital camera 200 includes a shutter button 201, a speech shutter on-off switch 202, a mode dial 203, a four-direction selection button 204, an ENTER button 205, a power button 206, and a recording button 207. These components correspond to the operation unit 102 shown in FIG. 1.

In the following, various units of the digital camera 200 will be described.

The shutter button 201 is a shutter button used to issue a command for capturing an image.

The speech shutter on-off switch 202 is a switch that performs switching as to whether a function for executing an image capturing operation in accordance with a speech command is used.

The mode dial 203 is a mode dial used to switch an operation mode of the digital camera 200 to one of existing shooting modes, existing playback modes, and the like by being rotated.

The four-direction selection button 204 is a four-direction selection button used to input a command for moving something vertically or horizontally.

The ENTER button 205 is a button used to execute a certain operation.

The power button 206 is a power button used to switch on/off the power of the digital camera 200.

The recording button 207 is a button used to manually input the start and end of input speech.

Next, a function of the speech detection unit 106 will be specifically described.

The speech detection unit 106 detects a sound that satisfies a first predetermined standard (start condition). When the speech detection unit 106 detects a sound that satisfies the first predetermined standard (start condition), the speech detection unit 106 performs a detection operation for detecting a sound that satisfies a second predetermined standard.

After a preset time has passed from the time at which the sound that satisfies the first predetermined standard (start condition) was detected, the speech detection unit 106 determines the detected sound to be a sound that satisfies the second predetermined standard.

The speech detection unit 106 determines the detected sound not to be a sound that satisfies the first predetermined standard (start condition) in accordance with changes in an input audio signal. That is, the speech detection unit 106 cancels the detection operation for detecting the sound that satisfies the first predetermined standard.

Similarly, the speech detection unit 106 detects a sound that unsatisfies a second predetermined standard (end condition). When the speech detection unit 106 detects a sound that unsatisfies the second predetermined standard (end condition), the speech detection unit 106 performs a detection operation for detecting a sound that unsatisfies a second predetermined standard.

After a preset time has passed from the time at which the sound that unsatisfies the second predetermined standard (end condition) was detected, the speech detection unit 106 determines the detected sound not to be a sound that satisfies the second predetermined standard.

The speech detection unit 106 determines the detected sound to be a sound that satisfies the second predetermined standard (end condition) in accordance with changes in an input audio signal. That is, the speech detection unit 106 cancels the detection operation for detecting the sound that unsatisfies the second predetermined standard.

FIG. 3 is a diagram showing an example of detection states determined by the speech detection unit 106.

The speech detection unit 106 changes from being in one of four states to another in accordance with a detected situation of an audio signal.

A first state 301 is a state which comes immediately after inputting of sound starts, that is, a state in which no utterance is detected (hereinafter, the state being referred to as SILENCE).

A second state 302 is a state in which a detection operation for detecting the start of an utterance that satisfies a predetermined standard is performed but the start of the utterance is not set (hereinafter the state being referred to as POSSIBLE SPEECH).

A third state 303 is a state in which the start of an utterance that satisfies the predetermined standard is set (hereinafter, the state being referred to as SPEECH).

A fourth state 304 is a state in which a detection operation for detecting the start of an utterance ends and, that is, in which the start of no utterance is set (hereinafter, the state being referred to as POSSIBLE SILENCE).

Here, an example in which a detection status of an utterance (hereinafter simply referred to as "sound detection status") is classified into four states has been described in the first embodiment. However, even if the second state 302 and the fourth state 304 are combined, the sound detection status is classified into three states, and the sound detection status is determined to be one of the three states, an effect similar to that of the first embodiment is obtained.

In the first state 301, if the detection operation for detecting the start of an utterance is performed (if the detection operation for detecting the start of inputting of an utterance that is input from the microphone 112 and satisfies the predetermined standard is performed), the detection state changes to the utterance state 302. This operation is denoted by reference numeral 305.

In the second state 302, if the detection operation for detecting the start of an utterance is canceled, the detection state changes to the first state 301. This operation is denoted by reference numeral 306.

Moreover, in the second state 302, if the start of an utterance is set, the detection state changes to the third state 303. This operation is denoted by reference numeral 307.

In the third state 303, if a detection operation for detecting the end of an utterance is performed (if the end of inputting of an utterance that is input from the microphone 112 and satisfies a predetermined standard is performed), the detection state changes to the fourth state 304. This operation is denoted by reference numeral 308.

In the fourth state 304, if the detection operation for detecting the end of an utterance is canceled, the detection state changes to the third state 303. This operation is denoted by reference numeral 309.

Moreover, in the fourth state 304, if the end of an utterance that satisfies the predetermined standard is set, the detection operation for detecting the utterance ends. This operation is denoted by reference numeral 310.

When the end of an utterance is set in the fourth state 304, the detection operation for detecting the utterance ends. Thus, the calculation amount, the power, and the like for performing speech detection processing can be suppressed when performing speech recognition processing, which will be described below.

Here, in a case where the end of an utterance is set in the fourth state 304, the detection state may change to the first state 301.

Changing of the detection state from the fourth state 304 to the first state 301 enables a detection operation for detecting the next utterance continuously.

Figure 4:
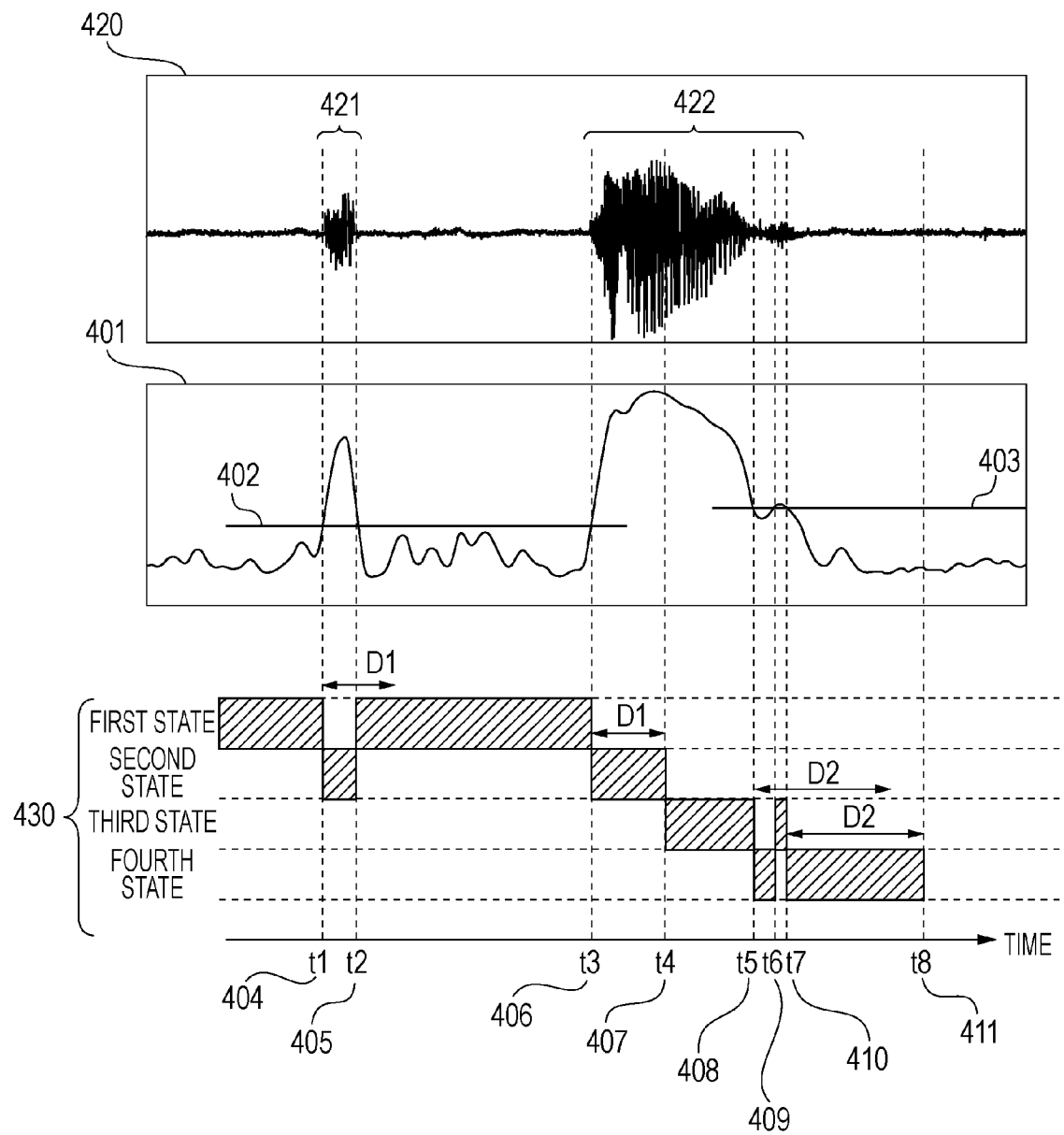
FIG. 4 is an overview diagram showing an example of an operation of the speech detection unit.

FIG. 4 is an overview diagram showing an example of processing performed by the speech detection unit 106.

FIG. 4 shows a case where a user utters the word "Shoot".

Here, "Shoot" is an example of a command for starting capturing of an image. The content of commands will be described below.

In FIG. 4, an audio signal is denoted by reference numeral 420.

Moreover, a section of the audio signal 420 is denoted by reference numeral 421. The audio signal in the section 421 is not an audio signal of utterance of a user but an audio signal of a detected noise.

Moreover, a section of the audio signal 420 is denoted by reference numeral 422. The audio signal in the section 422 represents the sound of "Shoot" uttered by a user.

The speech detection unit 106 according to the first embodiment performs a detection operation for detecting a sound volume of an utterance, the sound volume being used when it is determined whether the utterance satisfies a predetermined standard.

Here, a detection operation for detecting the start of utterance is performed if a sound volume of utterance becomes greater than or equal to a predetermined threshold, and a detection operation for detecting the end of utterance is performed if the sound volume becomes less than a predetermined threshold. That is, the state in which the utterance satisfies the start condition means a state in which the sound volume of the utterance becomes greater than or equal to the predetermined threshold. Meanwhile, the state in which the utterance satisfies the end condition means a state in which the sound volume of the utterance becomes less than the predetermined threshold.

In FIG. 4, a sound volume (E(t)) obtained from the audio signal 420 by an existing method is denoted by reference numeral 401. A threshold (TH1) used to perform the detection operation for detecting the start of utterance is denoted by reference numeral 402. A threshold (TH2) used to perform the detection operation for detecting the end of utterance is denoted by reference numeral 403.

Here, E(t) represents a sound volume at a frame that starts at time t.

That is, if the sound volume $E(t) \geq TH1$ in the first state 301, the detection operation for detecting the start of utterance is performed, and if the sound volume $E(t) < TH2$ in the third state 303, the detection operation for detecting the end of utterance is performed.

Moreover, the same threshold (TH1=TH2) may be used to perform the detection operation for detecting the start and end of utterance.

Moreover, if a predetermined number of frames satisfying a condition ($E(t) \geq TH1$) used to perform the detection operation for detecting the start of utterance, the start of utterance is set.

Similarly, if a predetermined number of frames satisfying a condition ($E(t) < TH2$) used to perform the detection operation for detecting the end of utterance, the end of utterance is set.

In the first embodiment, the number of frames to set the start of utterance is denoted by D1 (for example, four frames) and the number of frames to set the end of utterance is denoted by D2 (for example, six frames).

Thus, if D1 frames satisfying $E(t) \geq TH1$ are detected after the detection state changes to the second state 302, the start of utterance is set and the detection state changes to the third state 303.

Moreover, if a sound volume becomes $E(t) < TH1$ before D1 frames are detected and after the detection state changes to the second state 302, the detection state changes to the first state 301.

Here, processing for changing the detection state from the second state 302 to the first state 301 corresponds to processing for canceling the detection operation for detecting the start of utterance.

Similarly, if D2 frames satisfying $E(t) < TH2$ are detected after the detection state changes to the fourth state 304, the end of utterance is set and speech detection ends.

Moreover, if a sound volume becomes $E(t) \geq TH2$ before D2 frames are detected and after the detection state changes to the fourth state 304, the detection state changes to the third state 303.

Here, processing for changing the detection state from the fourth state 304 to the third state 303 corresponds to processing for canceling the detection operation for detecting the end of utterance.

Here, D1 which is the number of frames to set the start of utterance is usually smaller than D2 which is the number of frames to set the end of utterance; however, they may be the same (D1=D2).

Detection states of the speech detection unit 106 with respect to the audio signal 420 are denoted by reference numeral 430.

The first state 301 is a state after inputting of speech is started.

At a frame that starts at time t1 at which the sound volume 401 becomes greater than or equal to the threshold TH1, the detection operation for detecting the start of utterance is performed. This operation is denoted by reference numeral 404. The detection state changes to the second state 302.

At a frame that starts at time t2 before the number of frames becomes D1 after the detection state has changed to the second state 302, the sound volume 401 becomes less than the threshold TH1. Thus, the detection operation for detecting the start of utterance is canceled. This operation is denoted by reference numeral 405. The detection state changes to the first state 301.

Then, at a frame that starts at time t3, the sound volume 401 becomes greater than or equal to the threshold TH1 again. Thus, the detection operation for detecting the start of utterance is performed. This operation is denoted by reference numeral 406. The detection state changes to the second state 302.

At time t4 at which the number of frames at which the sound volume 401 is greater than or equal to the threshold TH1 becomes D1 after the detection state has changed to the second state 302, the start of utterance is determined to be time t3. This operation is denoted by reference numeral 407. The detection state changes to the third state 303.

In the third state 303, at a frame that starts at time t5 at which the sound volume 401 becomes less than the threshold TH2 used to perform the detection operation for detecting the end of utterance, the detection operation for detecting the end of utterance is performed. This operation is denoted by reference numeral 408. The detection state changes to the fourth state 304.

Since the sound volume 401 becomes greater than or equal to the threshold TH2 at a frame that starts at time t6, the detection operation for detecting the end of utterance is canceled. This operation is denoted by reference numeral 409. The detection state changes to the third state 303.

Since the sound volume 401 becomes less than the threshold TH2 again at a frame that starts at time t7, the detection operation for detecting the end of utterance is performed. This operation is denoted by reference numeral 410. The detection state changes to the fourth state 304.

Thereafter, at time t8 at which the number of frames at which the sound volume 401 becomes less than the threshold TH2 becomes D2 after the detection state has changed to the fourth state 304, the end of utterance is determined to be time t7. This operation is denoted by reference numeral 411.

Moreover, the start of utterance and the end of utterance may be set, instead of the number of frames, in accordance with whether a state in which a sound volume which is greater than or equal to a threshold and a state in which a sound volume which is less than a threshold are maintained for a predetermined time period, respectively.

That is, if a sound volume greater than or equal to the threshold (TH1) is detected for a time period S1 (40 milliseconds) corresponding to the number D1 of frames (for example, four frames) that is to set the start of utterance, the start of utterance is set.

Similarly, if a sound volume less than or equal to the threshold (TH2) is detected for a time period S1 (60 milliseconds) corresponding to the number D2 of frames (for example, six frames) that is to set the end of utterance, the end of utterance is set.

Here, even when a time period is detected in which a predetermined sound volume is intermittently detected, the time period may be used to determine whether the start of utterance or the end of utterance should be set.

With such a configuration, even if a sound to be detected is not detected for a moment for breathing and a sound volume for a frame corresponding to the moment is lower, the speech detection unit 106 can execute appropriate processing in a case where the sound is detected again soon after the moment.

Figure 5:
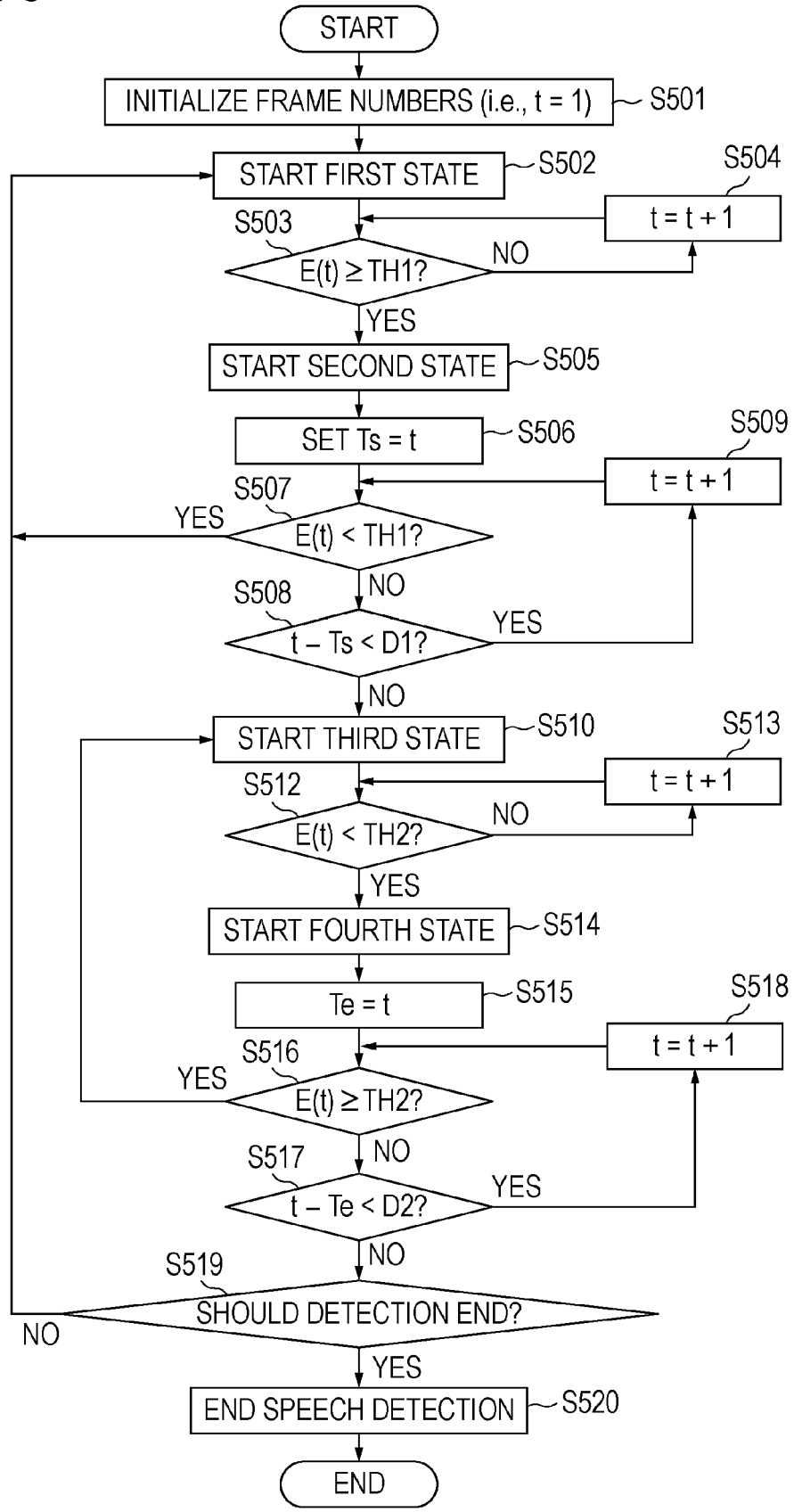
FIG. 5 is a flowchart of a processing operation performed by the speech detection unit.

FIG. 5 is a flowchart of a processing operation performed by the speech detection unit 106.

In step S501, frame numbers are initialized when the detection operation for detecting the start of utterance is performed.

In the following, a detection operation for detecting speech is performed in units of one frame.

That is, when the speech detection unit 106 performs processing in units of one frame, the speech detection unit 106 calculates a sound volume in units of one frame.

Here, a sound volume is obtained by, for example, calculating a value regarding signal strength such as log power from an audio signal by an existing method.

Here, a log power for a short time period is calculated by, for example, the following expression.

$$E(t)=\log\{\Sigma(x(t,i)^2)/N\}(1\leq i\leq N) \qquad \text{Eq (1)}$$

Here, N represents the number of samples of an audio signal per frame, and i represents an index of a sample of an audio signal in a frame.

Moreover, x (t, i) represents the i-th sample of an audio signal in a frame that starts at time t.

Moreover, x(t, i)^2 means the square of x(t, i).

Next, in step S502, processing in the first state 301 starts.

Next, in step S503, it is determined whether a sound volume $E(t)$ at a frame starting at time t is greater than or equal to the threshold TH1 used to perform the detection operation for detecting the start of utterance.

If the sound volume $E(t)$ is greater than or equal to the threshold TH1 (YES in step S503), the detection state changes to the second state 302 in step S505.

If the sound volume $E(t)$ is less than the threshold TH1 (NO in step S503), processing is executed again for the next frame (step S504).

Next, in step S506, a frame at which the detection state changes to the second state 302 is set as an utterance start frame Ts.

Next, in step S507, it is determined whether the sound volume $E(t)$ is less than the threshold TH1.

If the sound volume $E(t)$ is less than the threshold TH1 (YES in step S507), the detection state changes to the first state 301.

If the sound volume $E(t)$ is greater than or equal to the threshold TH1 (NO in step S507), then the process continues in step S508, where it is determined whether the number of frames obtained after the detection state has changed to the second state 302 is less than D1.

If the number of frames obtained after the detection state has changed to the second state 302 is less than D1 (YES in step S508), processing is executed again for the next frame (step S509).

If the number of frames obtained after the detection state has changed to the second state 302 is greater than or equal to D1 (NO in step S508), the detection state changes to the third state 303 in step S510.

Next, in step S512, it is determined whether the sound volume E(t) is less than the threshold TH2 used to perform the detection operation for detecting the end of utterance.

If the sound volume E(t) is less than the threshold TH2 (YES in step S512), the detection state changes to the fourth state 304 in step S514.

If the sound volume E(t) is greater than or equal to the threshold TH2 (NO in step S512), processing for the next frame is performed in step S513.

Next, in step S515, a frame at which the detection state changes to the fourth state 304 is set as an end-of-utterance frame Te.

Next, in step S516, it is determined whether the sound volume E(t) is greater than or equal to the threshold TH2.

If the sound volume E(t) is greater than or equal to the threshold TH2 (YES in step S516), the detection state changes to the third state 303.

If the sound volume E(t) is less than the threshold TH2 (NO in step S516), then the process continues in step S517, where it is determined whether the number of frames obtained after the detection state has changed to the fourth state 304 is less than D2.

If the number of the frames obtained after the detection state has changed to the fourth state 304 is less than D2 (YES in step S517), processing for the next frame is performed in step S518.

If the number of the frames obtained after the detection state has changed to the fourth state 304 is greater than or equal to D2 (NO in step S517), then the process continues in step S519, where it is determined whether speech detection should end.

If speech detection should end (YES in step S519), the speech detection terminates in step S520.

If speech detection should not end (NO in step S519), the detection state changes to the first state 301 in a case where a detection operation for the next utterance is to be performed.

By performing the above-described processing, the speech detection unit 106 detects an utterance period that starts from the frame Ts to the frame Te.

The speech recognition unit 107 obtains a speech recognition result by processing an audio signal obtained in an utterance period (from the frame Ts to the frame Te) detected by the speech detection unit 106.

Here, an utterance period is detected in accordance with a change in the sound volume in the above-described description using the flowchart of FIG. 5; however, a detection operation for detecting utterance is not limited to this.

Moreover, when speech detection is performed, a known feature such as zero crossing times, a pitch, or a likelihood ratio output from a speech model, or a likelihood ratio output from a non-speech model or a feature obtained by combining these features may be used.

Use of such a feature enables the start of utterance and the end of utterance to be efficiently detected even under an environment in which, for example, the loudness of an input ambient sound is large.

Here, a condition used to set the start of utterance and the end of utterance may be a condition other than a condition regarding the number of frames, as described below.

For example, a predetermined threshold TH3 is provided which is larger than the threshold TH1 used to perform the detection operation for detecting the start of utterance. After the detection operation for detecting the start of utterance is performed, at a frame at which a sound volume reaches the predetermined threshold TH3, the start of utterance may be determined to be the time at which the detection operation for detecting the start of utterance was performed.

Moreover, in order to set the end of utterance, a predetermined threshold TH4 is provided which is smaller than the threshold TH2 used to perform the detection operation for detecting the end of utterance. After the detection operation for detecting the end of utterance is performed, at a frame at which a sound volume becomes less than the predetermined threshold TH4, the end of utterance may be determined to be the time at which the detection operation for detecting the end of utterance was performed.

Use of such conditions can shorten a time period to set the start of utterance and the end of utterance.

Next, a case in which an image capturing operation is executed in accordance with a speech command in the digital camera 200 having the above-described configuration will be described.

An example of processing performed by the speech detection unit 106, the image pickup control unit 123, and the image storage control unit 104 is described below referring to FIG. 3.

In FIG. 3, if the detection operation for detecting the start of utterance is performed, which is denoted by reference numeral 305, the image pickup control unit 123 causes the image pickup unit 103 to execute an image capturing operation.

Here, a case in which the detection operation for detecting the start of utterance is performed (305) corresponds to a case in which it is determined to be YES in step S503 of FIG. 5.

Moreover, if the detection operation for detecting the end of utterance is performed, which is denoted by reference numeral 308, the image pickup control unit 123 causes the image pickup unit 103 to execute an image capturing operation.

Here, a case in which the detection operation for detecting the end of utterance is performed (308) corresponds to a case in which it is determined to be YES in step S512 of FIG. 5.

That is, the image pickup unit 103 captures an image when an internal state of speech detection processing changes from the first state 301 to the second state 302 or when the internal state of speech detection processing changes from the third state 303 to the fourth state 304.

Moreover, the image storage control unit 104 deletes the captured image if the detection operation for detecting the start of utterance is canceled, which is denoted by reference numeral 306, or if the detection operation for detecting the end of utterance is canceled, which is denoted by reference numeral 309.

Here, a case in which the detection operation for detecting the start of utterance is canceled (306) corresponds to a case in which it is determined to be YES in step S507 of FIG. 5.

Moreover, a case in which the detection operation for detecting the end of utterance is canceled (309) corresponds to a case in which it is determined to be YES in step S516 of FIG. 5.

That is, when the detection operation for detecting the start of utterance is canceled in FIG. 3, if the detection operation for detecting the start of utterance (305) is performed, the image storage control unit 104 deletes a captured image.

Similarly, when the detection operation for detecting the end of utterance is canceled, if the detection operation for detecting the end of utterance (308) is performed, the image storage control unit 104 deletes a captured image.

That is, when the internal state changes from the second state 302 to the first state 301 or when the internal state changes from the fourth state 304 to the third state 303, an image captured immediately before the internal state changes is deleted.

Figure 9:
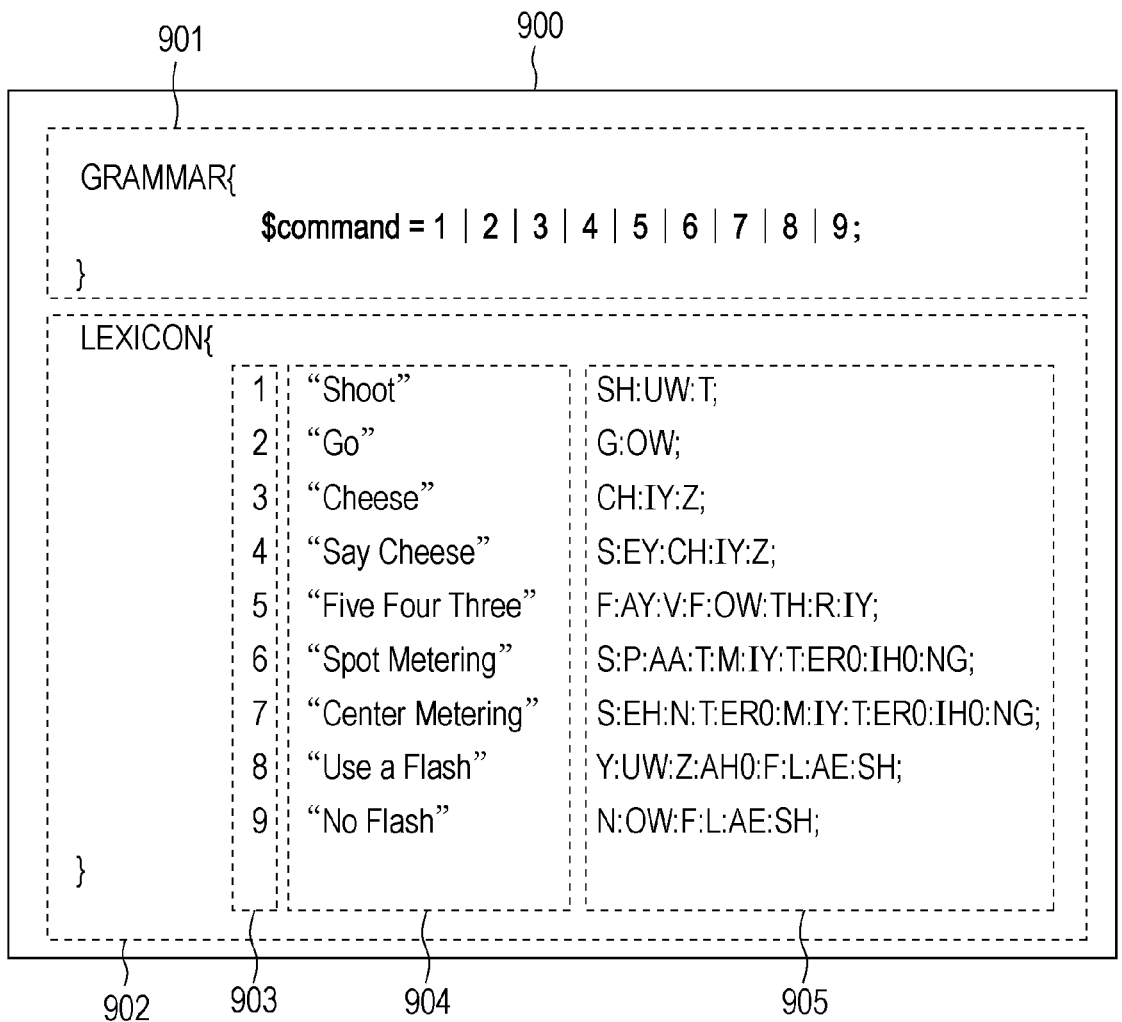
FIG. 9 is a diagram showing an example of a speech recognition grammar utilized in the first embodiment of the present invention.

FIG. 9 is a diagram showing an example of a speech recognition grammar utilized in the first embodiment.

In this example, a speech recognition grammar 900 includes a portion 901 in which rules are described and a portion 902 in which recognizable commands and pronunciations are described.

The IDs 903 of words, commands 904 regarding the words, and pronunciations 905 of the words are described in the portion 902 in which recognizable commands and pronunciations are described. Each of rows in the portion 902 has the ID 903 of one of the words, a command 904 regarding the word, and a pronunciation 905 of the word.

Here, a method for recognizing nine words described in the portion 902 is described in a program code which the speech recognition unit 107 can read, in the potion 901 in which rules are described.

"Shoot", "Go", "Cheese", "Say Cheese", and "Five Four Three" are speech commands for starting an image capturing operation described below.

"Spot Metering" (spot metering), "Center Metering" (center-weighted metering), "Use a flash" (activation of the strobe light), and "No Flash" (deactivation of the strobe light) are speech commands for setting shooting conditions.

In the following description, the speech recognition grammar 900 shown in FIG. 9 is used as a language model in the digital camera 200 according to the first embodiment.

Here, in the first embodiment, speech commands are described as an example; however, the present invention is not limited to these. For example, a sound that can be interpreted to mean a speech command can be utilized instead of the speech command.

For example, a laugh, a sound caused when a train passes, or the like may be used. Here, in this case, not a speech recognition technology but a known technology in which the content of sound is detected is used instead.

With such a configuration, even in a case where not only speech but also a characteristic sound is input via the microphone 112, a user can obtain an image captured at a time corresponding to one of various characteristic sounds.

A recognition result control table is data in a table format in which processing for capturing an image, processing for activating metering, and processing for activating the strobe light corresponding a recognition results are described. The recognition result processing unit 108 refers to the recognition result table when determining camera control corresponding to a recognition result.

Here, the recognition result control table is stored in the memory (for storing a recognition result control table) 114 in the form of program code that can be read by the recognition result processing unit 108.

FIG. 10 is a diagram showing an example of a recognition result control table.

In FIG. 10, recognition result processing data is denoted by reference numeral 1000.

Commands utilized for speech recognition are denoted by reference numeral 904 and the content of control, which is denoted by reference numeral 1002, for a corresponding one of the commands denoted by reference numeral 904 for the digital camera 200 are described.

Figure 6:
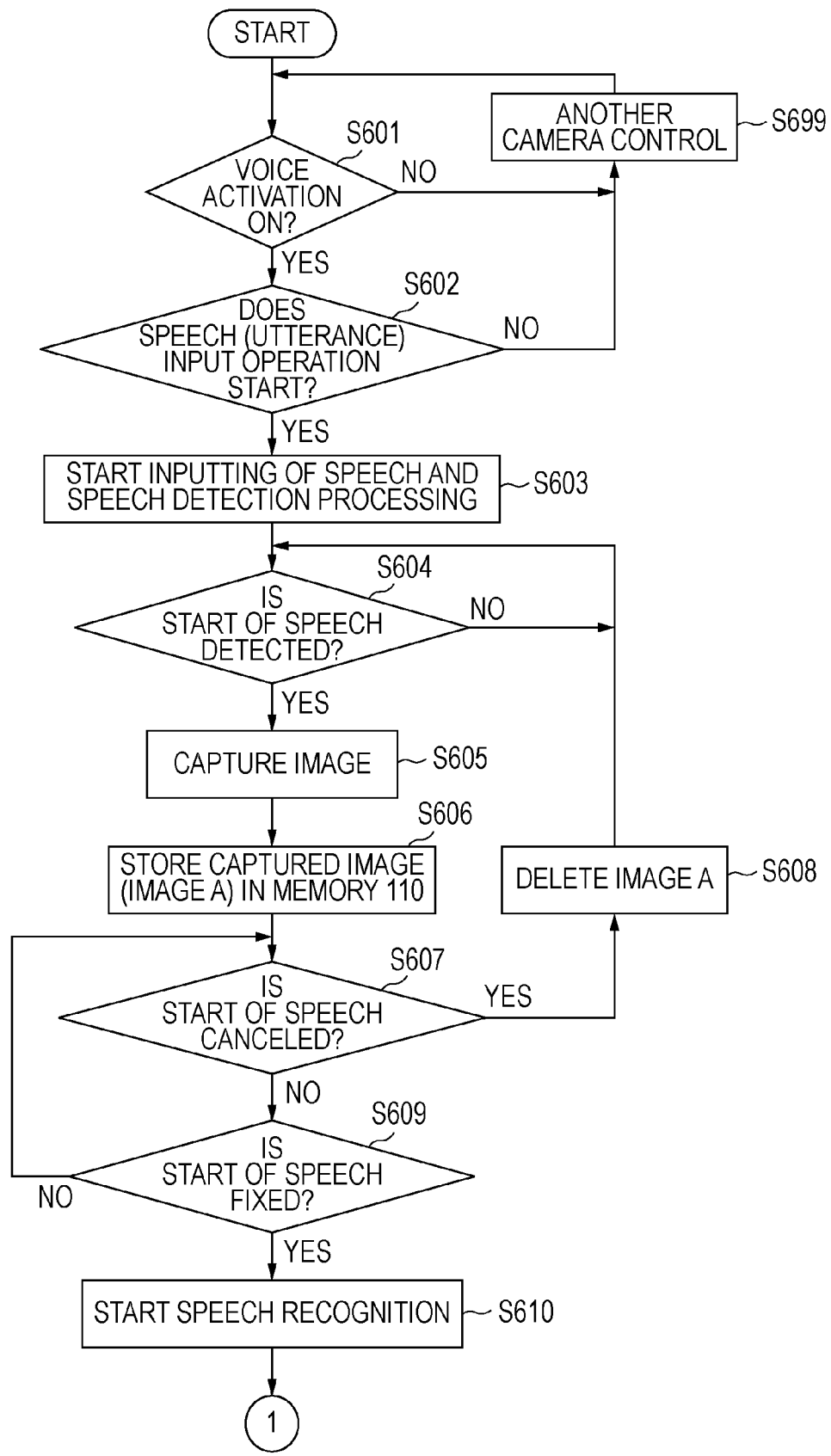
FIG. 6 is a first flowchart showing an example of processing performed by a digital camera when capturing of an image is commanded by speech.
Figure 7:
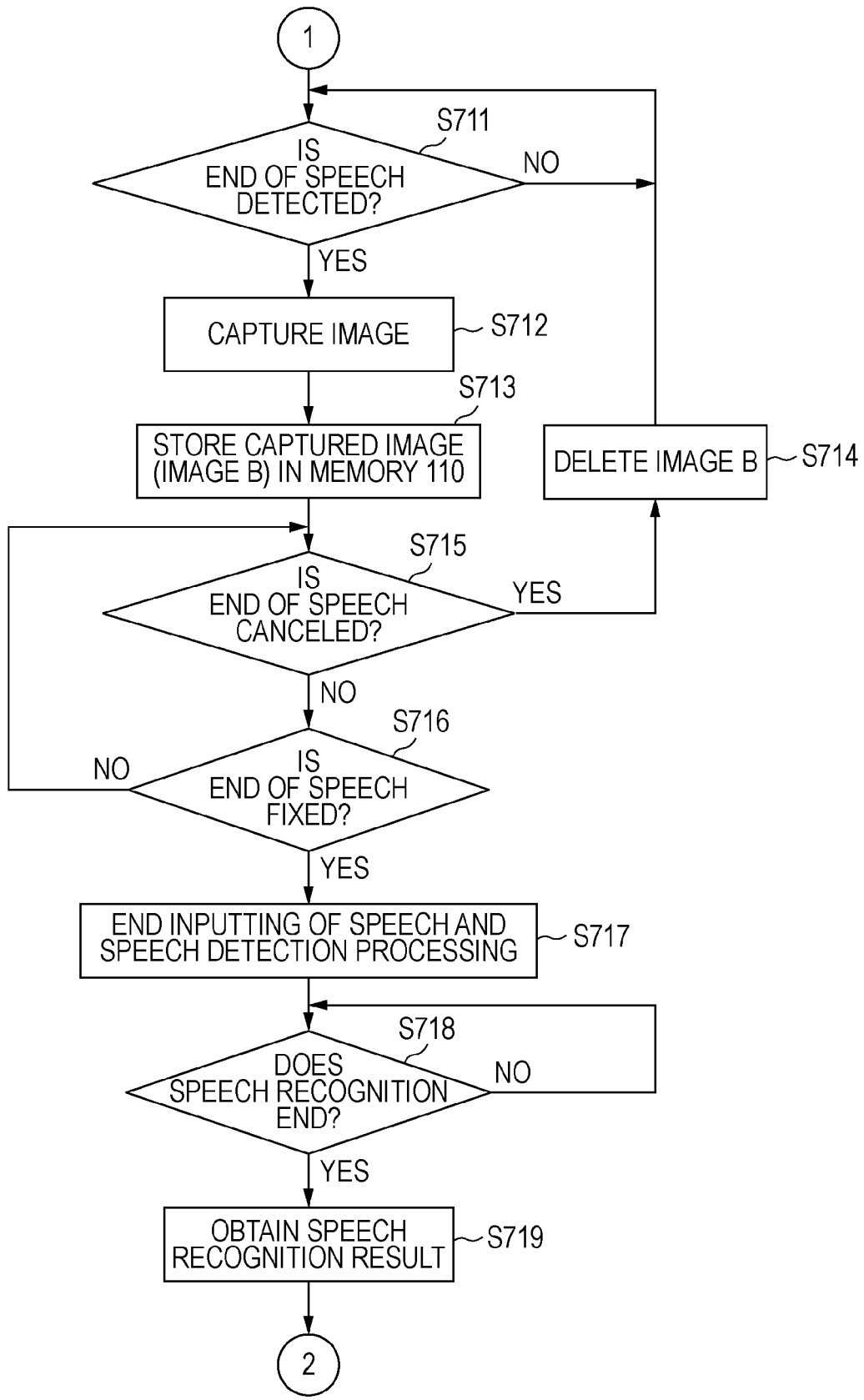
FIG. 7 is a second flowchart showing the example of processing performed by the digital camera when capturing of an image is commanded by speech.
Figure 8:
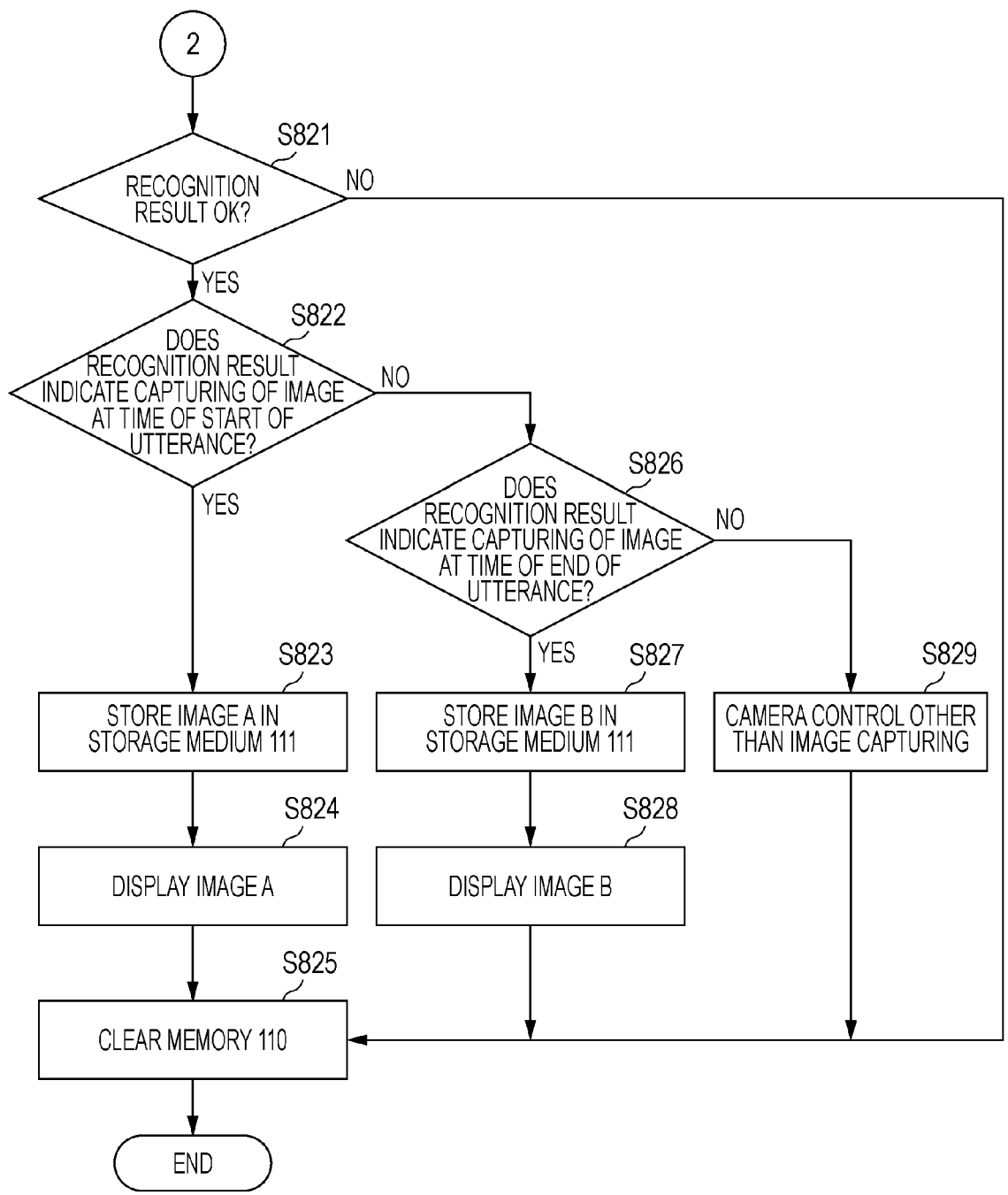
FIG. 8 is a third flowchart showing the example of processing performed by the digital camera when capturing of an image is commanded by speech.

FIGS. 6 to 8 are flowcharts showing an example of processing performed by the digital camera 200 when capturing of an image is commanded by speech.

First, the flowchart of FIG. 6 is used to describe processing.

In step S601, it is determined whether or not a voice activation function is activated.

If the voice activation function is activated (YES in step S601), then the process continues in step S602, where it is determined whether a recording button 207 is pressed and an operation for starting inputting of speech (utterance) is performed.

If the voice activation function is not activated (NO in step S601), processing other than processing regarding the voice activation function is performed (i.e., another camera control) in step S699.

Here, a user operates the speech shutter on-off switch 202 included in the operation unit 102 to switch between activation and deactivation of the voice activation function.

Moreover, the control unit 101 determines whether the voice activation function should be activated or deactivated.

If an operation for starting reception of speech is performed (YES in step S602), the speech input unit 105 starts processing for receiving speech and the speech detection unit 106 starts speech detection processing in step S603.

If an operation other than the operation for starting reception of speech is performed (NO in step S602), processing other than processing regarding the voice activation function (i.e., another camera control) is performed in step S699.

Here, the operation for starting reception of speech may be performed by an operation other than pressing of the recording button 207.

For example, a digital camera provided with an autofocus function performs focusing if the shutter button 201 is half pressed.

Here, processing for receiving speech may be started in association with the operation of the autofocus function. That is, if a user half presses the shutter button 201, processing for receiving speech and processing for detecting speech may be started.

With such a configuration, a manual operation is simplified. Thus, a user can quickly start processing for inputting speech.

Moreover, speech detection may be started without manually starting speech detection, when an audio signal is input to the speech input unit 105.

With such a configuration, processing for detecting speech can be quickly started. Moreover, even if a user cannot manually operate a camera, the user can start speech detection. Thus, such a configuration can be utilized in a monitoring camera, a security camera, a camera set at a high place, or the like.

In step S604, it is determined whether the speech detection unit 106 performs the detection operation for detecting the start of utterance.

Here, in step S604, whether the speech detection unit 106 performs the detection operation for detecting the start of utterance is determined in accordance with whether the speech detection unit 106 has executed processing for changing the internal state from the first state 301 to the second state 302.

If the speech detection unit 106 performs the detection operation for detecting the start of utterance (YES in step S604), the image pickup unit 103 executes an image capturing operation in step S605.

In step S606, the image storage control unit 104 stores first image data of an image captured in step S605, which is a previous step, in the memory (for storing images) 110.

Here, the image captured in step S605, that is, an image captured at a time at which the speech detection unit 106 performs the detection operation for detecting the start of utterance, is called an image A.

If the speech detection unit 106 does not perform the detection operation for detecting the start of utterance (NO in step S604), it is determined again whether the speech detection unit 106 performs the detection operation for detecting the start of utterance.

In step S607, it is determined whether the speech detection unit 106 should cancel the detection operation for detecting the start of utterance.

Here, in step S607, whether the speech detection unit 106 should cancel the detection operation for detecting the start of utterance is determined in accordance with whether the speech detection unit 106 has executed processing for changing the internal state from the second state 302 to the first state 301.

If the detection operation for detecting the start of utterance is canceled (YES in step S607), then the process continues in step S608, the image storage control unit 104 deletes the image A stored in the memory (for storing images) 110.

If the detection operation for detecting the start of utterance is not canceled (No in step S607), in step S609, it is determined whether the speech detection unit 106 has set the start of utterance.

Here, in step S609, whether the start of utterance is set/fixed is determined in accordance with whether the speech detection unit 106 has executed processing for changing the internal state from the second state 302 to the third state 303.

If the start of utterance is set/fixed (YES in step S609), the speech recognition unit 107 starts speech recognition processing in step S610.

If the start of utterance is not set/fixed (NO in step S609), it is determined again whether the detection operation for detecting the start of utterance should be canceled.

The following processing will be described with reference to the flowchart of FIG. 7.

In step S711, the speech detection unit 106 determines whether the detection operation for detecting the end of utterance is performed.

Here, in step S711, whether the detection operation for detecting the end of utterance is performed is determined in accordance with whether the speech detection unit 106 has executed processing for changing the internal state from the third state 303 to the fourth state 304.

If the detection operation for detecting the end of utterance is performed (YES in step S711), the image pickup unit 103 captures an image in step S712.

Next, in step S713, the image storage control unit 104 stores second image data of an image captured in step S712, which is a previous step, in the memory (for storing images) 110. Here, an image captured in step S712, that is, an image captured at a time at which the speech detection unit 106 performs the detection operation for detecting the end of utterance, is called an image B.

Here, there is a case in which an image is captured after a certain period of time (for example, 0.5 seconds) passes after, in general, "Say Cheese" or the like has uttered (after /z/ has uttered).

In consideration of this, in the first embodiment, the image pickup unit 103 captures an image after a predetermined delay time passes after the speech detection unit 106 has performed the detection operation for detecting the end of utterance "Say Cheese".

With such a configuration, the number of kinds of image-capturing times that a user desires can be increased.

Next, in step S715, the speech detection unit 106 determines whether the detection operation for detecting the end of utterance should be canceled.

Here, in step S715, whether the detection operation for detecting the end of utterance should be canceled is determined in accordance with whether the speech detection unit 106 has executed processing for changing the internal state from the fourth state 304 to the third state 303.

If the detection operation for detecting the end of utterance is canceled (YES in step S715), then the process continues in step S714, where the image storage control unit 104 deletes the image B stored in the memory (for storing images) 110.

Next, in step S716, it is determined whether the speech detection unit 106 should set/fixed the end of utterance.

Here, in step S716, whether the end of utterance should be set/fixed is determined in accordance with whether the speech detection unit 106 has ended changing of the internal state and keeps the internal state in the fourth state 304.

If the end of utterance is set/fixed (YES in step S716), processing performed by the speech input unit 105 and speech detection unit 106 ends in step S717.

If the end of utterance is not set/fixed (NO in step S716), it is determined again whether the detection operation for detecting the end of utterance should be canceled.

Next, in step S718 after speech detection ends, the speech recognition unit 107 performs speech recognition processing until all audio signals obtained in an utterance period detected by the speech detection unit 106 are processed.

If speech recognition processing ends (YES in step S718), in step S719, the recognition result processing unit 108 obtains a recognition result obtained by the speech recognition unit 107.

The following processing will be described with reference to the flowchart of FIG. 8.

In step S821, the recognition result processing unit 108 determines whether to receive or discard a command corresponding to a recognition score in the obtained recognition result.

Here, reception of a command means that the control unit 101 determines to perform control corresponding to a recognized command. Moreover, discarding of a command means that the control unit 101 determines not to perform control corresponding to a recognized command.

If an obtained recognition score is greater than or equal to a predetermined threshold and a corresponding command is received (YES in step S821), in step S822, control of the digital camera 200 is determined with reference to the recognition result control table, the control corresponding to the command included in the recognition result.

If a recognized command is a word ("Shoot" or "Go") that is a command for capturing an image at the time of the start of utterance (YES in step S822), in step S823, the image storage control unit 104 stores image data of the image A on the storage medium (for storing images) 111, the image A being stored in the memory (for storing images) 110.

Here, processing in step S823 is processing performed in accordance with determination of the recognition result processing unit 108.

Next, in step S824, the display control unit 109 displays the image A on the display 115 in such a manner that a user can check a captured image.

If a recognized command is not a word ("Shoot" or "Go") that is a command for capturing an image at the time of the start of utterance (NO in step S822), in step S826, it is determined whether the recognized command is a word ("Cheese") that is a command for capturing an image at the time of the end of utterance.

If the recognized command is a word ("Cheese") that is a command for capturing an image at the time of the end of utterance (YES in step S826), the process continues in step S827, where the image storage control unit 104 stores image data of the image B on the storage medium (for storing images) 111.

Here, processing in step S827 is processing performed in accordance with determination of the recognition result processing unit 108.

In step S828, the display control unit 109 displays the image B on the display 115 in such a manner that a user can check a captured image.

If the recognized command is a word ("Spot Metering" or the like) other than a word that is a command for capturing an image (NO in step S826), then the process continues in step S829, where the recognition result processing unit 108 controls the digital camera 200 by referring to the recognition result control table in such a manner that control other than control of capturing of an image is performed. The process then proceeds to step S825.

In step S825, the image storage control unit 104 deletes the image data of all images (images A and B) stored in the memory (for storing images) 110.

That is, if a predetermined command is not recognized and a recognition result is discarded, the image pickup unit 103 deletes captured images.

This processing discards recognition results regarding ambient noises, utterance of a word other than a recognition target, and speech that is not intended to operate a camera, such as speech of a person other than a user, and automatically deletes an image captured by erroneously detecting such a sound.

Here, in step S821, a threshold used for determination may be a preset fixed value or a value obtained by multiplying a recognition score by r (0<r), the recognition score being output by a garbage model.

A garbage model is an acoustic model generated using a noise in which a noise other than speech is included, or a plurality of estimated unknown words (words other than a recognition target), and is included in the memory (for storing speech recognition data) 113.

Here, in processing in steps S822 to S829, in accordance with a recognition result, one of an image captured at the time of the start of utterance and an image captured at the time of the end of utterance is determined to be an image that is to be stored.

Thus, a user can freely change an image-capturing time of an image that is to be stored, in accordance with the content of utterance.

Here, processing ends after step S825 in the above-described description. However, the procedure may proceed to processing in step S602 in order to continuously perform reception of the next speech.

With such a configuration, if reception of speech is started by half pressing the shutter button 201, camera control can be performed by inputting of speech as many times as possible while the shutter button 201 is half pressed.

For example, while the shutter button 201 is half pressed, utterance such as "Center Metering" or the like can set shooting conditions, and an image can be captured by the next utterance.

FIG. 11 is a diagram showing an operation in a case where an image is captured by mean of the speech command "Shoot" utilizing the digital camera 200 according to the first embodiment.

In FIG. 11, the horizontal axis 1150 represents time and time elapses from left to right. Reference numerals t1 to t7 each denote a time.

Reference numeral 1110 denotes an audio signal on which A/D conversion has been performed by the speech input unit 105.

Reference numeral 1111 denotes an audio signal (audio waveform) in a period during which a user utters "Shoot".

Reference numeral 1120 denotes sound volume. Changes in the sound volume 1120 corresponding to the audio signal 1110 are shown.

Reference numeral 1121 denotes a threshold (TH1) used to perform the detection operation for detecting the start of utterance and used by the speech detection unit 106. Reference numeral 1122 denotes a threshold (TH2) used to perform the detection operation for detecting the end of utterance and used by the speech detection unit 106.

Reference numeral 1130 denotes states recognized by the speech detection unit 106. Changes of the states 1130 are visually shown.

Reference numeral 1140 denotes details of an operation of the digital camera 200.

Next, an operation of the digital camera 200 will be described with respect to time from time t1 to time t7.

Time t1

The speech detection unit 106 performs the detection operation for detecting the start of utterance at a frame that starts at time t1 where the sound volume 1120 becomes greater than or equal to the threshold TH1. This operation corresponds to a process of detecting a sound that satisfies the above-described first predetermined standard (start condition).

Here, the speech detection unit 106 executes processing for changing the detection state from the first state 301 to the second state 302, which is denoted by reference numeral 1130 at time t1.

At the time at which the detection operation for detecting the start of utterance is performed, the image pickup unit 103 captures an image of a subject (IMG003). Then, the image storage control unit 104 stores image data of the captured image in the memory (for storing images) 110. These operations are denoted by reference numeral 1141.

Time t2

At a frame that starts at time t2 and that is the D1-th frame from the frame that starts at time t1 at which the detection operation for detecting the start of utterance is performed, the speech detection unit 106 determines the start of utterance to be time t1.

Simultaneously, speech recognition processing performed by the speech recognition unit 107 starts. These operations are denoted by reference numeral 1142.

Here, the speech detection unit 106 executes processing for changing the detection state from the second state 302 to the third state 303, which is denoted by reference numeral 1130 at time t2.

Time t3

Next, the speech detection unit 106 performs the detection operation for detecting the end of utterance at a frame that starts at time t3 where the sound volume 1120 becomes less than the threshold TH2. In this operation, a sound that satisfies the above-described predetermined standard (end condition) is detected.

Here, the speech detection unit 106 executes processing for changing the detection state from the third state 303 to the fourth state 304, which is denoted by reference numeral 1130 at time t3.

At time t3 at which the speech detection unit 106 performs the detection operation for detecting the end of utterance, the image pickup unit 103 captures an image of the object (IMG005). Then, the image storage control unit 104 stores image data of the captured image in the memory (for storing images) 110. These operations are denoted by reference numeral 1143.

Time t4

If the sound volume 1120 becomes greater than or equal to the threshold TH2 at a frame that starts at time t4 and that is a frame prior to the frame that is the D2-th frame from the frame that starts at time t3 at which the speech detection unit 106 performs the detection operation for detecting the end of utterance, the speech detection unit 106 cancels the detection operation for detecting the end of utterance.

Here, the speech detection unit 106 executes processing for changing the detection state from the fourth state 304 to the third state 303, which is denoted by reference numeral 1130 at time t4.

At time t4 at which the detection operation for detecting the end of utterance is canceled, the image storage control unit 104 deletes the image data of the image IMG005 captured at time t3 at which the detection operation for detecting the end of utterance is performed, from the memory (for storing images) 110. These operations are denoted by 1144.

Time t5

The sound volume 1120 becomes less than the threshold TH2 at a frame that starts at time t5, and thus the speech detection unit 106 performs the detection operation for detecting the end of utterance.

Here, the speech detection unit 106 executes processing for changing the detection state from the third state 303 to the fourth state 304, which is denoted by reference numeral 1130 at time t5.

Moreover, the image pickup unit 103 captures an image of the object (IMG006) at time t5, and the image storage control unit 104 stores image data of the captured image in the memory (for storing images) 110. These operations are denoted by reference numeral 1145.

Time t6

The sound volume 1120 does not become greater than or equal to the threshold TH2 between the frame that starts at time t5 at which the detection operation for detecting the end of utterance is performed and a frame that starts at time t6 and that is the D2-th frame from the frame that starts at time t5. At the frame that starts at time t6, the speech detection unit 106 determines the end of utterance to be time t5. This operation is denoted by reference numeral 1146.

Here, as described above, the speech detection unit 106 may execute processing for changing the detection state from the fourth state 304 to the first state 301 or the speech detection unit 106 may end processing for changing the detection state.

Time t7

Thereafter, at time t7 at which processing performed by the speech recognition unit 107 ends, the recognition result processing unit 108 determines a control method for the digital camera 200. This operation is denoted by reference numeral 1147.

Here, if "Shoot" is obtained as a recognition result, processing corresponding to "Shoot" is determined with reference to the recognition result control table.

As shown in FIG. 10, "Shoot" is a command related to an image capturing operation that is performed at the time of the detected start of utterance.

In accordance with determination of the recognition result processing unit 108, the image storage control unit 104 stores the image data of the image (IMG003) captured at time t1 that is the time of the detected start of utterance, in the storage medium (for storing images) 111.

Simultaneously, the image storage control unit 104 deletes the image (IMG006) captured at the time of the end of utterance from the memory (for storing images) 110, without storing the image.

FIG. 12 is a diagram showing an operation in a case where an image is captured by means of the speech command "Cheese" utilizing the digital camera 200 according to the first embodiment.

Similar to FIG. 11, reference numeral 1250 denotes time, reference numeral 1210 denotes an audio signal, reference numeral 1220 denotes sound volume, 1230 denotes states recognized by the speech detection unit 106, and reference numeral 1240 denotes an operation of the digital camera 200.

Reference numeral 1211 denotes a noise, which happens to be input before a user utters. Reference numeral 1212 denotes a speech "Cheese" or the like, uttered by a user.

Reference numeral 1221 denotes a threshold (TH1) used to perform a detection operation for detecting an utterance period, which is used by the speech detection unit 106.

Here, in FIG. 12, the same threshold TH1 is used to detect the start of utterance and the end of utterance.

In the following, an operation of the digital camera 200 will be described with respect to time.

Time t1

At a frame that starts at time t1, if the speech detection unit 106 performs the detection operation for detecting the start of utterance, the image pickup unit 103 captures an image of an object 1202 (IMG001) corresponding to the frame that starts at time t1. Moreover, the image storage control unit 104 temporarily stores image data of the captured image in the memory (for storing images) 110. These operations are denoted by reference numeral 1241.

Time t2

At a frame that starts at time t2 and that is prior to the frame that is the D1-th frame from the frame at which the detection operation for detecting the start of utterance is performed, the sound volume 1220 becomes less than the threshold TH1, and thus the speech detection unit 106 cancels the detection operation for detecting the start of utterance.

Here, the image storage control unit 104 deletes the image (IMG001), which is captured in the operations 1241. These operations are denoted by reference numeral 1242.

Time t3

At a frame that starts at time t3, if the speech detection unit 106 performs the detection operation for detecting the start of utterance again, the image pickup unit 103 captures an image of an object 1203 (IMG003) corresponding to the frame that starts at time t3. Moreover, the image storage control unit 104 temporarily stores image data of the captured image in the memory (for storing images) 110. These operations are denoted by reference numeral 1243.

Time t4

At a frame that starts at time t4, if the speech detection unit 106 determines the start of utterance to be time t3, the speech recognition unit 107 starts speech recognition processing. These operations are denoted by reference numeral 1244.

Time t5

At a frame that starts at time t5, if the speech detection unit 106 performs the detection operation for detecting the end of utterance, the image pickup unit 103 captures an image of an object 1205 (IMG005) corresponding to the frame that starts at time t5. Moreover, then, the image storage control unit 104 temporarily stores image data of the captured image in the memory (for storing images) 110. These operations are denoted by reference numeral 1245.

Time t6

At a frame that starts at time t6, the speech detection unit 106 determines the end of utterance to be time t5. This operation is denoted by reference numeral 1246.

Time t7

After the end of utterance is determined to be time t5, at time t7 at which speech recognition processing performed by the speech recognition unit 107 ends, the recognition result processing unit 108 determines camera control in accordance with a recognition result. These operations are denoted by reference numeral 1247.

Here, as shown in FIG. 10, "Cheese" is a command related to an image capturing operation that is performed at the time of the detected end of utterance.

Thus, the image storage control unit 104 stores the image data of the image (IMG005) captured at time t5 that is the time of the detected end of utterance, in the storage medium (for storing images) 111. The image storage control unit 104 deletes the image data of the image (IMG003) captured at time t3 that is the time of the detected start of utterance, without storing the image data.

As described above using FIGS. 11 and 12, if an image at the time of the start of utterance is to be captured using the digital camera 200 described in the first embodiment, just "Shoot" (or "Go") is to be uttered.

Moreover, if an image at the time of the end of utterance is to be captured using the digital camera 200 described in the first embodiment, then just "Cheese" is needed to be uttered.

Moreover, if an image at a time at which a certain period of time has passed from the time of the start of utterance is to be captured, just "Five Four Three" needs to be uttered, the certain period of time corresponding to a time period for which "Two One Zero" is uttered.

Moreover, if an image at a time at which a certain period of time (for example, 0.5 seconds) has passed from the time of the end of utterance, just "Say Cheese" needs to be uttered.

If "Shoot" (or "Go") is uttered, an image is captured before speech recognition ends. Thus, it is suitable for a case in which an image of a moving object such as a vehicle is captured.

Moreover, if "Cheese" (or "Say Cheese") is uttered, an image is captured after the end of utterance. Thus, it is suitable for a case in which an image is captured after objects are informed of a shooting time, such as a group photo or a commemorative photo.

Moreover, if "Five Four Three" is uttered, an image can be captured at a time after a certain period of time has passed from the time of the start of utterance, the certain period of time corresponding to a time period for which "Two One Zero" is uttered.

Therefore, an image can be captured at an arbitrary shooting time in accordance with a shooting scene, and the convenience of operation for users is improved.

Moreover, a user may not need to delete images captured at unwilled times after images are captured.

That is, as described using FIG. 12, even in a case where an image is erroneously captured in accordance with an ambient noise which happens to be input when speech is input, if the start of speech is not set, the image is automatically deleted.

Moreover, even in a case where capturing of an image is triggered by means of a noise or utterance which is not intended to capture an image, if utterance which is not intended to trigger capturing of an image is recognized in processing in step S821 of FIG. 8, the recognition result is discarded and the erroneously captured image is deleted.

Thus, in a case where the start of shooting is triggered by means of a speech command, the first embodiment has an effect in reducing the occurrence of malfunctions due to ambient noises.

In the first embodiment, an image may be captured at a time at which the detection operation for detecting the start of utterance is performed or a time at which the detection operation for detecting the end of utterance is performed.

Figure 13:
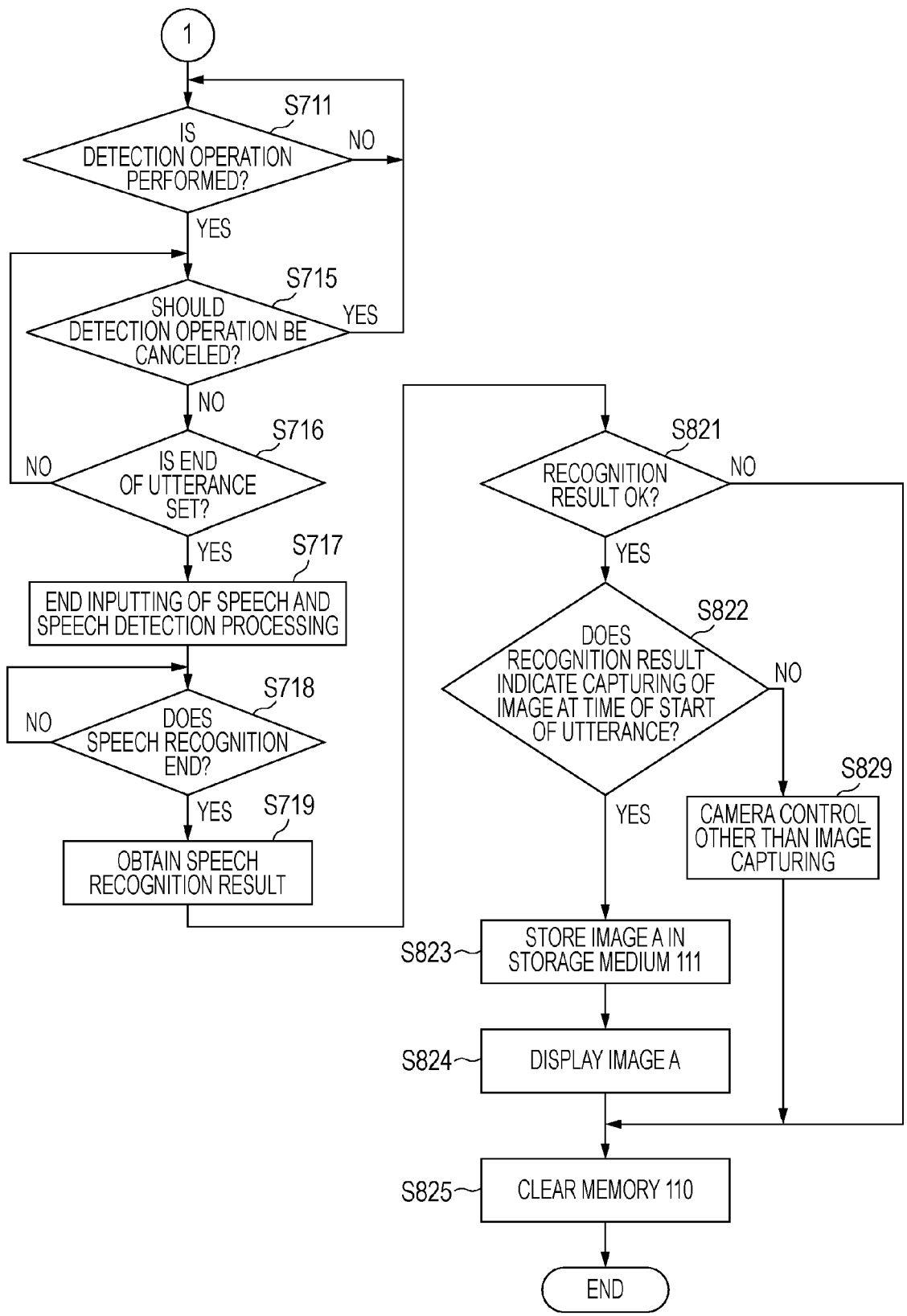
FIG. 13 is a flowchart in a case where an image is captured only at the time of the detected start of utterance.

FIG. 13 is a flowchart in a case where an image is captured only at the time of the detected start of utterance.

The flowchart shown in FIG. 13 illustrates processing in and after step S811, which is different from processing described using the flowcharts of FIGS. 6 to 8.

Moreover, the same processing as that in FIGS. 7 and 8 is denoted by the same reference numeral. In the following, only differences between FIG. 13 and FIGS. 7 and 8 will be described.

In the flowchart shown in FIG. 13, processing for capturing an image at a time at which the detection operation for detecting the end of utterance is performed (steps S712 and S713) and processing for deleting a captured image (step S714) in the flowchart of FIG. 7 are not performed.

Moreover, in the flowchart shown in FIG. 13, processing performed by the recognition result processing unit 108 in a case where a word that is a command for capturing an image at the time of the end of utterance is recognized (steps S826, S827, and S828) in the flowchart of FIG. 8 is not performed.

Other processing is the same as that described using FIGS. 6 to 8.

Here, in a case where an image is captured only at the time of the detected start of utterance, words that are commands for capturing an image at the time of the end of utterance ("Cheese", "Say Cheese", or the like) are deleted from the speech recognition grammar shown in FIG. 9.

If the speech recognition grammar is not changed, the recognition result control data shown in FIG. 10 is changed. Processing performed when "Cheese", "Say Cheese", or the like is recognized is changed to processing for capturing an image at the time of the detected start of utterance.

As a result, if a user utters "Cheese" or "Say Cheese", image data of an image captured at the time of the start of utterance is stored in the storage medium (for storing images) 111.

In a case where an image is captured only at the time of the detected end of utterance, changes may be similarly performed. In this case, processing for capturing an image when the detection operation for detecting the start of utterance is performed (steps S605 and S606) and processing performed when the detection operation for detecting the start of utterance is canceled (step S608) are omitted.

Moreover, steps S822 to S824 among processing performed by the recognition result processing unit 108 are omitted.

Here, if a recognition result is received in step S821 (YES in step S821), processing in and after step S826 is performed.

Moreover, a word that is a command for capturing an image at the time of the start of utterance is deleted from the speech recognition grammar 900 or details of processing described in the recognition result control data is changed.

In the first embodiment, the digital camera 200 may be configured to store image data of images captured at the time of the detected start of utterance and at the time of the detected end of utterance, in accordance with a recognition result, in the storage medium (for storing images) 111.

For example, if the recognition result control data is described in such a manner that an image is captured at both of the time of the detected start of utterance "Say Cheese" and the time of the detected end of utterance "Say Cheese", image data of images at both of the times is stored in the storage medium (for storing images) 111.

With such a configuration, the number of kinds of image-capturing times that a user desires can be increased and the convenience of operation for users is improved.

In the first embodiment, if a recognition result is discarded (NO in step S821) in processing performed by the recognition result processing unit 108, whether the images A and B stored in the memory (for storing images) 110 should be deleted (step S825) may be checked by a user.

Moreover, a user may select an image that is to be stored in the storage medium (for storing images) 111.

Moreover, if a recognition result is discarded, both the images A and B may be stored in the storage medium (for storing images) 111.

For example, the images A and B are displayed on the display 115 and whether image data should be deleted can be selected using the four-direction selection button 204.

Moreover, a user selects an image that is to be stored using the four-direction selection button 204, and image data of an image selected at a time at which the ENTER button 205 is pressed is stored in the storage medium (for storing images) 111.

If a word other than a word that is a command for capturing an image is recognized (NO in step S826), similarly, a user may check whether an image should be deleted and select an image that is to be stored in the storage medium (for storing images) 111.

Moreover, the image data of the images A and B may be stored in the storage medium (for storing images) 111.

With such a configuration, in a case where an image pickup function using a speech command is used in an environment in which speech recognition performance degrades, an image can be prevented from being erroneously deleted by speech that is erroneously recognized and the convenience of operation for users is improved.

Here, the number of images held in one speech recognition process may be determined in accordance with the storage capacity of the memory (for storing images) 110.

With such a configuration, as many image candidates that a user desires as possible can be temporarily stored in the memory (for storing images) 110 with consideration of the storage capacity of the memory (for storing images) 110.

If the difference between a recognition score for a word that is a command for capturing an image at a time and a recognition score for another word that is a command for capturing an image at a different time is less than a predetermined threshold in processing performed by the recognition result processing unit 108, both of images captured at the time of the start of utterance and the time of the end of utterance may be stored in the storage medium (for storing images) 111.

For example, if the difference between a recognition score for "Shoot", which is a command for capturing an image at the time of the start of utterance, and a recognition score for "Cheese", which is a command for capturing an image at the time of the end of utterance is less than a predetermined value, both of images captured at the time of the start of utterance and the time of the end of utterance are stored in the storage medium (for storing images) 111.

Alternatively, the two images are displayed on the display 115 and a user may select an image or images.

With such a configuration, in a case where an image pickup function using a speech command is used in an environment in which speech recognition performance may degrade, an image can be prevented from being erroneously deleted by speech that is erroneously recognized and the convenience of operation for users is improved.

In the first embodiment, description has been made regarding a case in which image data of a captured image is temporarily stored in the memory (for storing images) 110 and the image data of the image is stored in the storage medium (for storing images) 111 after a recognition result is set. However, the image data of the image may be directly stored in the storage medium (for storing images) 111.

In this case, processing for deleting image data in steps S608 and S714 means that image data stored in the storage medium (for storing images) 111 is deleted.

Moreover, processing in steps S823 and S827 is not performed.

Furthermore, if a recognition result is discarded (NO in step S821) or if a recognition result is not a word that is a command for capturing an image (NO in step S826), the image data of the images A and B stored in the storage medium (for storing images) 111 is deleted.

Furthermore, if a recognition result is a word that is a command for capturing an image at the time of the start of utterance, the image data of the image B is deleted. If a recognition result is a word that is a command for capturing an image at the time of the end of utterance, the image data of the image A is deleted.

For example, in a case where the digital camera 200 according to the first embodiment is used at a place which tends to be suffered from ambient noises, such as a side of a road, the internal state of the speech detection unit 106 may frequently change in a short period of time.

If capturing of an image and deleting of image data are repeatedly performed in a short period of time, when a continuous-shots function of the digital camera 200 is activated, the digital camera 200 may not be able to appropriately capture an image immediately after image data is deleted and the image may not be stored in the memory (for storing images) 110.

In order to resolve the matter mentioned above, for example, the image data of the captured image A is not deleted in step S608 at a time at which the detection operation for detecting the start of utterance is canceled, and the image data of the image A may be stored in the memory (for storing images) 110 until at a time at which the detection operation for detecting the start of the next utterance is performed.

In this case, at the time at which the detection operation for detecting the start of the next utterance is performed, the image data of the image A is deleted or the image data of the image A is overwritten with image data of a newly captured image.

Similarly, the image data of the image B may not be deleted in a case where the detection operation for detecting the end of utterance is canceled in step S715, and may be stored in the memory (for storing images) 110 until the detection operation for detecting the end of the next utterance is performed.

With such a configuration, even in a case where the speed of taking continuous shots is not faster than the speed of changing a state for speech detection, at least the image of the first shot among continuous shots can be stored.

Here, in the first embodiment, description has been made regarding a camera. However, the present invention can be applied to other image pickup apparatuses such as a video camera.

In the first embodiment, a known stereo microphone is used as the microphone 112.

Moreover, the speech recognition unit 107 may use, as a feature as described above, a relationship between a sound volume of an audio signal input via the left microphone 112 and a sound volume of an audio signal input via the right microphone 112, a relationship between pitches of the audio signals, or the like.

By using such a feature, for example, a sound source coming toward the right side of the digital camera 200 can be distinguished from a sound source coming toward the left side of the digital camera 200. That is, a situation at the time of capturing an image is recognized and an image can be captured.

In the first embodiment, processing for capturing an image at the time of the end of utterance may be allocated to the command "Say Cheese" instead of "Cheese" shown as an example of commands included in the recognition result control table.

Moreover, processing for capturing an image at the time of the start of utterance may be allocated to the command "Now" instead of "Go" shown as an example of commands included in the recognition result control table.

Figure 16:
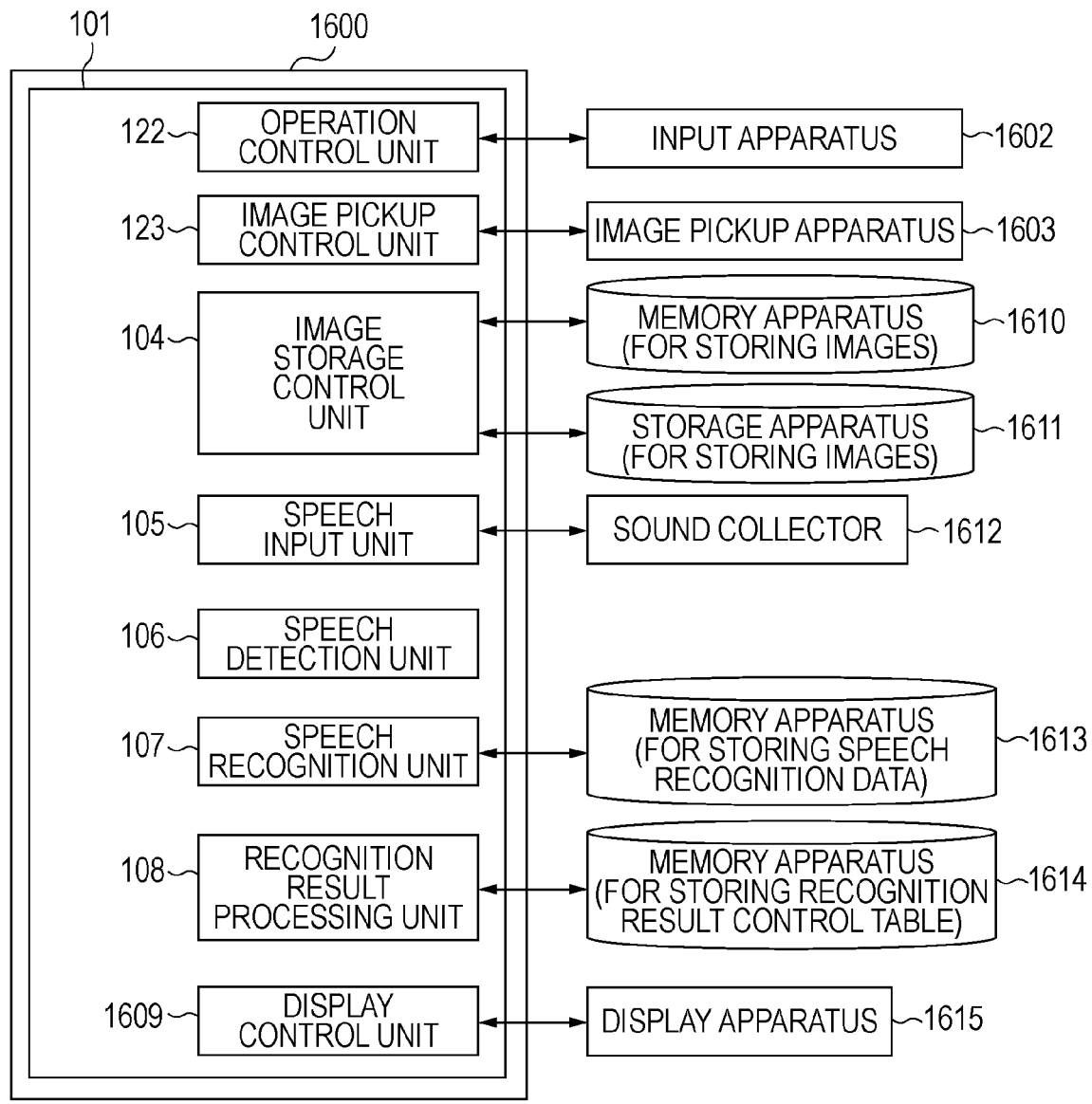
FIG. 16 is a functional block diagram showing an example of the structure of an information processing apparatus according to a second embodiment of the present invention.

FIG. 16 is a functional block diagram showing an example of the structure of an information processing apparatus 1600 according to a second embodiment of the present invention.

Here, components the same as those indicated in FIG. 1 will be denoted by the same reference numerals and description thereof will be omitted.

The information processing apparatus 1600 can be connected to an input apparatus 1602, an image pickup apparatus 1603, a memory apparatus (for storing images) 1610, a storage apparatus (for storing images) 1611, and a sound collector 1612.

Moreover, the information processing apparatus 1600 can be connected to a memory apparatus (for storing speech recognition data) 1613, a memory apparatus (for storing a recognition result control table) 1614, and a display apparatus 1615.

Here, the input apparatus 1602 has a function corresponding to the operation unit 102. The image pickup apparatus 1603 has a function corresponding to the image pickup unit 103. The memory apparatus (for storing images) 1610 has a function corresponding to the memory (for storing images) 110. The storage apparatus (for storing images) 1611 has a function corresponding to the storage medium (for storing images) 111.

Moreover, the sound collector 1612 has a function corresponding to the microphone 112. The memory apparatus (for storing speech recognition data) 1613 has a function corresponding to the memory (for storing speech recognition data) 113.

Moreover, the memory apparatus (for storing a recognition result control table) 1614 has a function corresponding to the memory (for storing a recognition result control table) 114. A display control unit 1609 has a function corresponding to the display control unit 109.

An example of the information processing apparatus 1600 is a microprocessor or the like.

Figure 14:
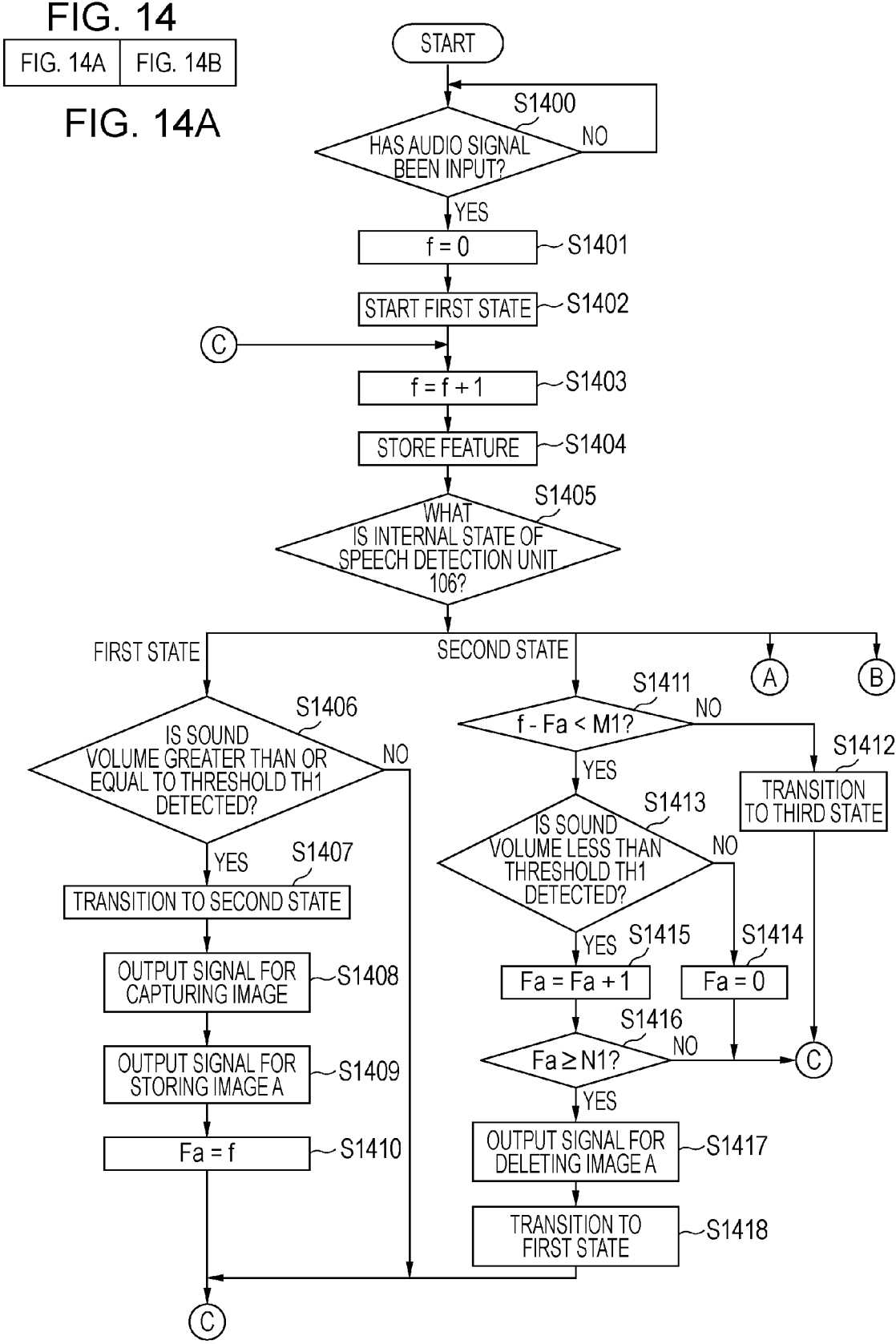
FIG. 14 is a first flowchart showing an example of a processing operation performed by an information processing apparatus.
Figure 14B:
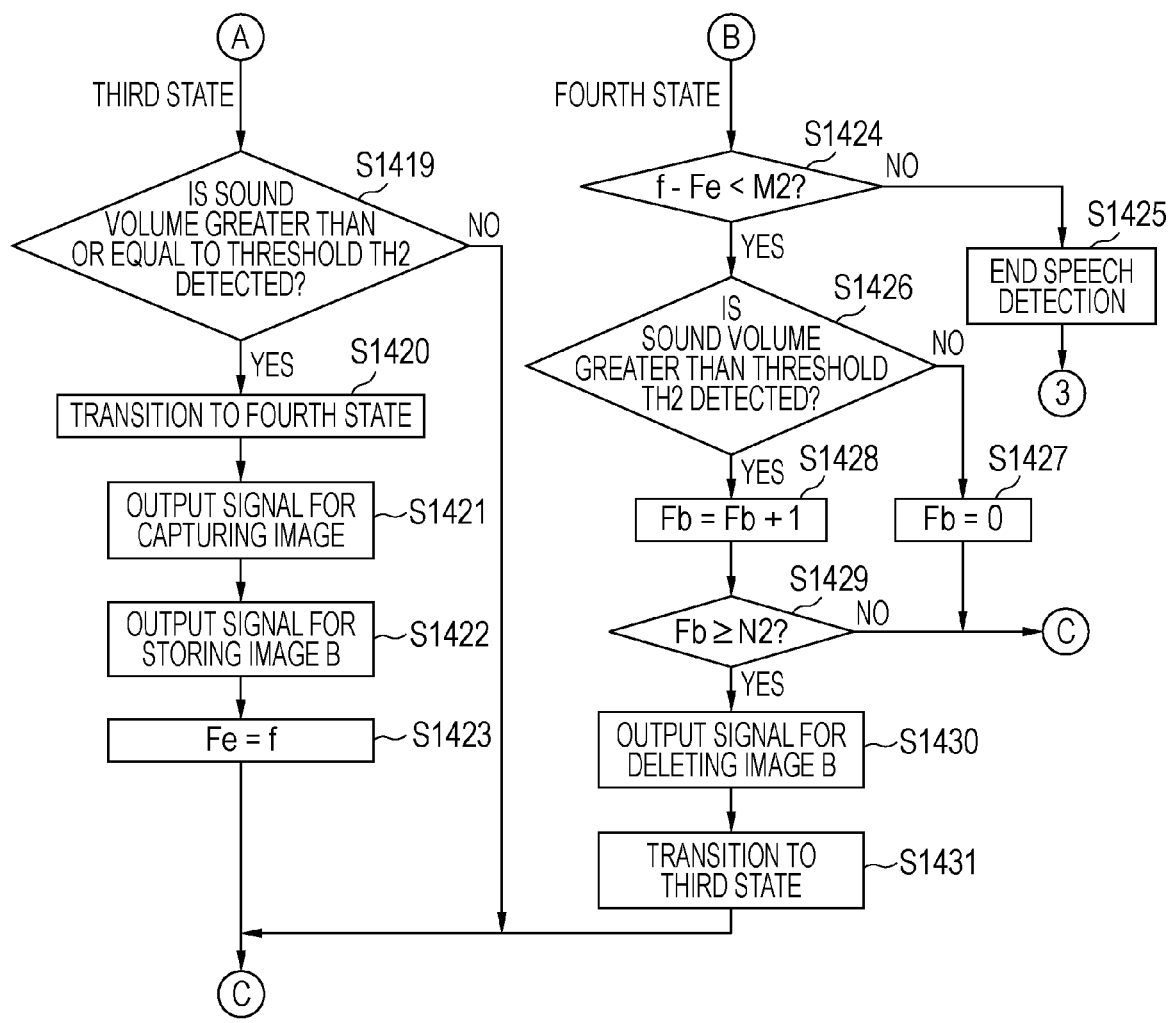
Figure 15:
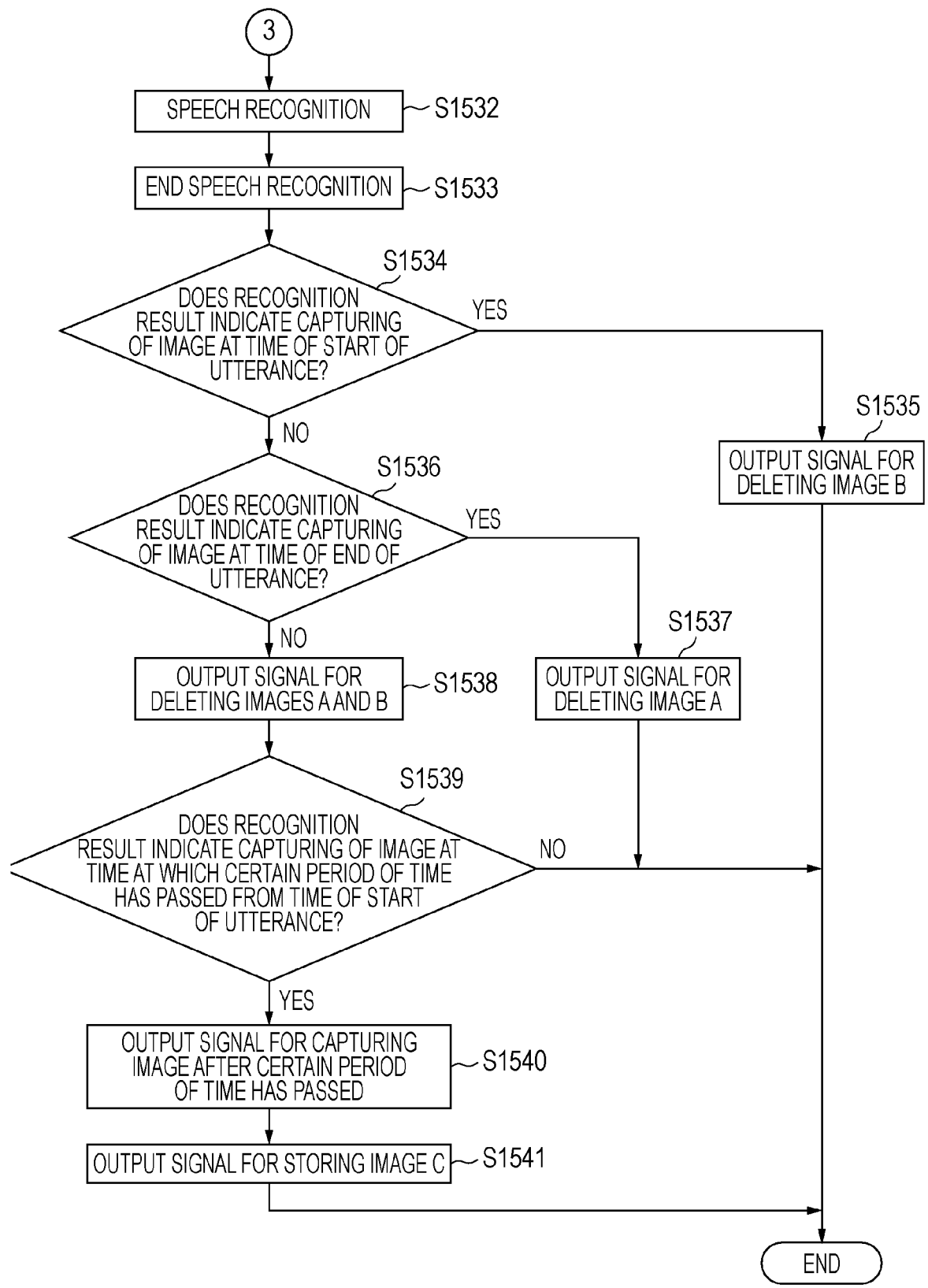
FIG. 15 is a second flowchart showing the example of a processing operation performed by the information processing apparatus.

FIGS. 14 and 15 are flowcharts showing an example of processing operation performed by the information processing apparatus 1600.

First, the flowchart of FIG. 14 is used to describe processing.

In step S1400, the speech input unit 105 determines whether an audio signal has been input.

If an audio signal has not been input (NO in step S1400), the procedure goes back to step S1400.

If an audio signal has been input (YES in step S1400), the speech detection unit 106 initializes a frame f (f=0) in step S1401.

Next, in step S1402, the speech detection unit 106 sets a detection state of the audio signal as the first state 301.

Next, in step S1403, the speech detection unit 106 sets a frame as a detection target.

Next, in step S1404, the speech detection unit 106 stores feature data regarding the audio signal input to the speech input unit 105.

Here, feature data is data used when the speech recognition unit 107 performs speech recognition.

Next, in step S1405, the speech detection unit 106 determines the detection state of speech to be one of the first to fourth states.

In step S1405, if the speech detection unit 106 determines the detection state to be the first state 301, the speech detection unit 106 determines, in step S1406, whether a sound volume greater than or equal to the threshold TH1 is detected, as first detection.

If a sound volume greater than or equal to the threshold TH1 is detected (YES in step S1406), the speech detection unit 106 changes the detection state to the second state 302 in step S1407 (this time is referred to as a first time).

Next, in step S1408, the image pickup control unit 123 outputs a signal for causing the image pickup apparatus 1603 to execute an image capturing operation.

Here, an image captured in accordance with a signal output in step S1408 is the image A.

Next, in step S1409, the image storage control unit 104 outputs a signal for causing the memory apparatus (for storing images) 1610 to store, as first acquisition, the image data of the image A captured in step S1408, which is a previous step.

Next, in step S1410, as first storage, the speech detection unit 106 stores the frame f, which is being processed, as an utterance-start frame Fs.

Next, the procedure returns to step S1403, and the speech detection unit 106 sets a frame as the next speech detection target.

Moreover, in step S1406, if a sound volume greater than or equal to the threshold TH1 is not detected (NO in step S1406), the procedure similarly returns to step S1403 and the speech detection unit 106 sets a frame as the next speech detection target.

Moreover, in step S1405, if the speech detection unit 106 determines the detection state to be the second state 302, in step S1411, it is determined whether a frame f that is being processed is the M1-th frame from the utterance-start frame Fs or a frame after the M1-th frame from the utterance-start frame Fs.

Moreover, if a frame f that is being processed is before the M1-th frame from the utterance-start frame Fs (YES in step S1411), in step S1413, it is determined whether the speech detection unit 106 detects a sound volume greater than the threshold TH1.

If a sound volume greater than the threshold TH1 is not detected (NO in step S1413), the speech detection unit 106 initializes a count value of a counter Fa in step S1414.

Next, the procedure returns to step S1403, and the speech detection unit 106 sets a frame as the next speech detection target.

Here, the counter Fa is used to determine whether the utterance-start frame Fs should be reset.

Moreover, if a sound volume less than the threshold TH1 is detected (YES in step S1413), the speech detection unit 106 increments a count value of the counter Fa by one in step S1415.

Next, in step S1416, the speech detection unit 106 determines whether the count value of the counter Fa is greater than or equal to N1.

If the count value of the counter Fa is greater than or equal to N1 (YES in step S1416), in step S1417, the image storage control unit 104 outputs a signal for deleting the image data of the image A stored in the memory apparatus (for storing images) 1610.

Here, processing in step S1417 corresponds to second deletion with respect to processing for deleting image data after speech recognition is performed.

Next, in step S1418, the speech detection unit 106 changes the detection state to the first state 301 in order to perform a first detection operation for detecting the start of utterance again.

Next, the procedure returns to step S1403, and the speech detection unit 106 sets a frame as the next speech detection target.

Moreover, if the count value of the counter Fa is less than N1 (NO in step S1416), the procedure similarly returns to step S1403 and the speech detection unit 106 sets a frame as the next speech detection target.

Moreover, in step S1411, if a frame f that is being processed is the M1-th frame from the utterance-start frame Fs or a frame after the M1-th frame from the utterance-start frame Fs (NO in step S1411), the speech detection unit 106 changes the detection state to the third state 303 in step S1412.

Moreover, in step S1405, if the speech detection unit 106 determines the detection state to be the third state 303, in step S1419, the speech detection unit 106 determines whether a sound volume less than or equal to the threshold TH2 is detected, as second detection.

If a sound volume less than or equal to the threshold TH2 is detected (YES in step S1419), the speech detection unit 106 changes the detection state to the fourth state 304 in step S1420 (this time is referred to as a second time).

Next, in step S1421, the image pickup control unit 123 outputs a signal for causing the image pickup apparatus 1603 to execute an image capturing operation.

Here, an image captured in accordance with a signal output in step S1421 is the image B.

Next, in step S1422, the image storage control unit 104 outputs a signal for causing the memory apparatus (for storing images) 1610 to store, as second acquisition, the image data of the image B captured in step S1421, which is a previous step.

Next, in step S1423, as second storage, the speech detection unit 106 stores the frame f that is being processed, as an utterance-end frame Fe.

Next, the procedure returns to step S1403, and the speech detection unit 106 sets a frame as the next speech detection target.

Moreover, in step S1419, if a sound volume greater than or equal to the threshold TH1 is not detected (NO in step S1419), the procedure similarly returns to step S1403 and the speech detection unit 106 sets a frame as the next speech detection target.

Moreover, in step S1405, if the speech detection unit 106 determines the detection state to be the fourth state 304, in step S1424, it is determined whether the frame f that is being processed is the M2-th frame from the utterance-end frame Fe or a frame after the M2-th frame from the utterance-end frame Fe.

Moreover, if a frame f that is being processed is a frame before the M2-th frame from the utterance-end frame Fe (YES in step S1424), in step S1426, it is determined whether the speech detection unit 106 detects a sound volume greater than the threshold TH2.

If a sound volume greater than the threshold TH2 is not detected (NO in step S1426), the speech detection unit 106 initializes a count value of a counter Fb in step S1427.

Next, the procedure returns to step S1403, and the speech detection unit 106 sets a frame as the next speech detection target.

Here, the counter Fb is used to determine whether the utterance-end frame Fe should be reset.

Moreover, if a sound volume greater than the threshold TH2 is detected (YES in step S1426), the speech detection unit 106 increments a count value of the counter Fb by one in step S1428.

Next, in step S1429, the speech detection unit 106 determines whether the count value of the counter Fb is greater than or equal to N2.

If the count value of the counter Fb is greater than or equal to N2 (YES in step S1429), in step S1430, the image storage control unit 104 outputs a signal for deleting the image data of the image B stored in the memory apparatus (for storing images) 1610.

Here, processing in step S1430 corresponds to third deletion with respect to processing for deleting image data after speech recognition is performed.

Next, in step S1431, the speech detection unit 106 changes the detection state to the third state 303 in order to perform a second detection operation for detecting the end of utterance again.

Next, the procedure returns to step S1403, and the speech detection unit 106 sets a frame as the next speech detection target.

Moreover, if the count value of the counter Fb is less than N2 (NO in step S1429), the procedure similarly returns to step S1403 and the speech detection unit 106 sets a frame as the next speech detection target.

Moreover, if the frame f that is being processed in step S1424 is the M2-th frame from the utterance-end frame Fe or a frame after the M2-th frame from the utterance-end frame Fe (NO in step S1424), the speech detection unit 106 ends speech detection in step S1425. The procedure then goes to step S1532.

Next, the flowchart of FIG. 15 is used to describe processing.

In step S1532, the speech recognition unit 107 performs speech recognition in accordance with the feature data of frames obtained in step S1504 and speech recognition data.

Next, in step S1533, speech recognition performed by the speech recognition unit 107 ends.

Here, processing in step S1533 is executed after the speech recognition unit 107 obtains a speech recognition result.

Next, in step S1534, the recognition result processing unit 108 determines whether the recognition result indicates a command for capturing an image at the time of the start of utterance.

If the recognition result indicates a command for capturing an image at the time of the start of utterance (YES in step S1534), a signal for deleting the image B is output in step S1535.

If the recognition result does not indicate a command for capturing an image at the time of the start of utterance (NO in step S1534), in step S1536, the recognition result processing unit 108 determines whether the speech recognition result indicates a command for capturing an image at the time of the end of utterance.

If the recognition result indicates a command for capturing an image at the time of the end of utterance (YES in step S1536), a signal for deleting the image A is output in step S1537.

If the recognition result does not indicate a command for capturing an image at the time of the end of utterance (NO in step S1536), a signal for deleting the images A and B is output in step S1538.

Next, in step S1539, the recognition result processing unit 108 determines whether the recognition result indicates a command for capturing an image at a time at which a certain period of time has passed from the time of the start of utterance.

If the recognition result indicates a command for capturing an image at the time at which a certain period of time has passed from the time of the start of utterance (YES in step S1539), in step S1540, the image pickup control unit 123 outputs a signal for causing the image pickup apparatus 1603 to execute an image capturing operation after a certain period of time has passed (this time is referred to as a third time).

Here, an image captured in accordance with a signal output in step S1540 is an image C.

Next, in step S1541, the image storage control unit 104 outputs a signal for causing the memory apparatus (for storing images) 1610 to store, as third acquisition, image data of the image C captured in step S1540, which is a previous step, and the procedure ends.

Moreover, if the recognition result does not indicate a command for capturing an image at the time at which a certain period of time has passed from the time of the start of utterance (NO in step S1539), the procedure ends.

With such a configuration, a first image (image A) captured at the time of the start of utterance, which is a first relationship, and a second image (image B) captured at the time of the end of utterance, which is a second relationship, can be obtained in an utterance period.

Moreover, a third image (image C) captured at the time at which a certain period of time has passed from the start of utterance, which is a third relationship, can be obtained in an utterance period.

Furthermore, in accordance with the content of speech within an utterance period, an image captured at a time desired by a user can be selected from among a plurality of image.

Moreover, with such a configuration, an image captured at a time desired by a user can be efficiently obtained by operating external devices in synchronization with the information processing apparatus 1600 according to the second embodiment.

Moreover, according to the information processing apparatus 1600 according to the second embodiment, even in a case where intermittent speech is input, such intermittent speech can be recognized as one command. Thus, even in a case where a word for which the utterance period is long is used as a command, the probability of being a recognition error is decreased.

Here, the present invention can also be realized by providing a storage medium on which program code of software that realizes a function described in the above-described embodiments, to a system or an apparatus and by reading and executing the program code, which is read and executed by a computer of the system or apparatus.

Here, the computer may be a central processing unit (CPU), a microprocessing unit (MPU), or the like.

In this case, the program code which is computer readable and is read from the storage medium realizes the function described in the above-described embodiments. The storage medium on which the program code is stored is an invention.

Examples of a storage medium used to supply program code are a flexible disk, a hard disk, an optical disc, an magneto-optical disk, a compact disc-read-only memory (CD-ROM), a compact disc recordable (CD-R), a magnetic tape, a nonvolatile memory card, a read-only memory (ROM), and the like.

Moreover, the function described in the above-described embodiments does not have to be realized by just executing the program code read by the computer. Part of or the entire actual processing for realizing the function described in the above-described embodiments may be performed by an operating system (OS) or the like in accordance with the content of the program code.

Here, a case in which the function described in the above-described embodiments is realized by this processing is also included in the present invention.

Here, the OS is running on the computer.

Moreover, the program code read from the storage medium is written into a memory included in a function expansion board inserted in the computer or a memory included in a function expansion unit connected to the computer.

A case in which part of or the entire actual processing is thereafter performed by a CPU included in the function expansion board or function expansion unit in accordance with the content of the program code and the function described in the above-describe embodiments is realized by the processing is also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-194800, filed Jul. 29, 2008, which is hereby incorporated by reference herein in its entirety.

What is claimed is:

1. A method comprising:
    detecting a start of a first sound that satisfies a preset standard or an end of the first sound;
    performing speech recognition of the first sound;
    capturing image data in response to detection of the start or end of the first sound, wherein a timing of the capturing of the image data is before a speech recognition of the first sound is completed;
    storing the obtained image data in a memory; and
    determining whether to store the captured image data in a storage or to delete the captured image data from the memory, in accordance with a speech recognition result of the first sound.

2. The method according to claim 1, further comprising:
    deleting, from the memory, the image data determined to be the data that is to be deleted.

3. The method according to claim 1,
    wherein capturing of image data is executed at a time of the detected start of the first sound or at a time of the detected end of the first sound.

4. The method according to claim 3, further comprising:
    detecting a start of a first sound that satisfies a preset standard or an end of the first sound;
    capturing image data in response to detection of the start or end of the first sound;
    storing the obtained image data in a memory; and determining whether to store the captured image data in a storage or to delete the captured image data from the memory, in accordance with the speech recognition result of the first sound;

capturing image data when the end of the first sound is detected, and deleting the obtained image data from the memory in a case where a second sound that satisfies the preset standard exists within a preset time period after the time of the detected end of the first sound;

detecting an end of the second sound; and capturing image data as second image data in response to detection of the end of the second sound, wherein capturing of image data is executed at a time of the detected start of the first sound or at a time of the detected end of the first sound.

5. The method according to claim 1, wherein capturing of image data is executed when a preset delay time period has passed from the time of the detected start of the first sound or when a preset delay time period has passed from the time of the detected end of the first sound.

6. The method according to claim 1, wherein the first sound is any one of a command that capturing of image data when sound starts is preferable and a command that capturing of image data when sound ends is preferable.

7. A method comprising:

detecting a start of a first sound that satisfies a preset standard or an end of a first sound;

capturing image data in response to detection of the start or end of the first sound;

storing the captured image data in a memory; and determining whether to store the captured image data in a storage or to delete the captured image data from the memory, in accordance with a speech recognition result of the first sound;

capturing image data when the start of the first sound is detected, and deleting the captured image data from the memory in a case where the first sound does not last for a preset time period after a time of the detected start of the first sound;

detecting a start of a second sound that satisfies the preset standard; and capturing image data again as first image data, in response to detection of the start of the second sound, wherein capturing of image data is executed at a time of the detected start of the first sound or at a time of the detected end of the first sound.

8. An apparatus comprising:

a first detection unit configured to detect a start of a sound that satisfies a preset standard, a first capturing unit configured to capture first image data in response to detection of the start of the sound, a first storage control unit configured to store the first image data in a memory, a second detection unit configured to detect an end of the sound, a second capturing unit configured to capture second image data in response to detection of the end of the sound, a second storage control unit configured to store the second image data in the memory;

an obtaining unit configured to obtain a speech recognition result of the sound; and a determination unit configured to determine one of the first image data and the second image data to be data that is to be stored in a storage and determine the other one to be data that is to be deleted from the memory, in accordance with the speech recognition result of the sound.

9. A method comprising:

detecting a start of a sound that satisfies a preset standard;

capturing first image data in response to detection of the start of the sound;

storing the first image data in a memory;

detecting an end of the sound;

capturing second image data in response to detection of the end of the sound;

storing the second image data;

obtaining a speech recognition result of the sound; and determining one of the first image data and the second image data to be data that is to be stored in a storage and determining the other one to be data that is to be deleted from the memory, in accordance with the speech recognition result of the sound.

10. A non-transitory computer-readable storage medium having computer-executable instructions stored thereon for causing an apparatus to perform an information processing method, the computer-readable storage medium comprising:

computer-executable instructions for detecting a start of a first sound that satisfies a preset standard or an end of the first sound;

computer-executable instructions for performing speech recognition of the first sound;

computer-executable instructions for capturing image data in response to detection of the start or end of the first sound, wherein a timing of the capturing of the image data is before the speech recognition of the first sound is completed;

computer-executable instructions for storing the obtained image data in a memory;

computer-executable instructions for obtaining a speech recognition result of the first sound; and computer-executable instructions for determining whether to store the captured image data in a storage or to delete the captured image data from the memory, in accordance with the speech recognition result of the first sound.

11. An apparatus comprising:

a detection unit configured to detect a start of a first sound that satisfies a preset standard or an end of the first sound;

a control unit configured to perform speech recognition of the first sound;

a capturing unit configured to capture image data in response to detection of the start or end of the first sound, wherein a timing of the capturing of the image data is before the speech recognition of the first sound is completed;

a storage control unit configured to store the obtained image data in a memory; and a determining unit configured to determine whether to store the captured image data in a storage or to delete the captured image data from the memory, in accordance with a speech recognition result of the first sound.

12. The apparatus according to claim 11, wherein the first sound is any one of a command that capturing of image data when sound starts is preferable and a command that capturing of image data when sound ends is preferable.

* * * * *